United States Patent
Oura et al.

[11] Patent Number: 6,038,267
[45] Date of Patent: Mar. 14, 2000

[54] DIGITAL DEMODULATOR, MAXIMUM-VALUE SELECTOR, AND DIVERSITY RECEIVER

[75] Inventors: Hideto Oura; Yoshiyuki Ishii; Yuji Iguchi, all of Tokyo, Japan

[73] Assignee: Oki Electric Industry Co., Ltd., Tokyo, Japan

[21] Appl. No.: 08/788,960

[22] Filed: Jan. 24, 1997

[30] Foreign Application Priority Data

Jan. 26, 1996 [JP] Japan .................................. 8-011801
May 22, 1996 [JP] Japan .................................. 8-127136

[51] Int. Cl.$^7$ ................................................. H03D 3/22
[52] U.S. Cl. ...................... 375/329; 375/340; 375/347; 375/371; 329/304
[58] Field of Search ............................ 322/28; 358/455; 360/51; 364/514; 365/189.04; 375/316, 329, 340, 345, 354, 355, 356, 371, 372, 347; 708/212; 329/304; 348/497; 386/94

[56] References Cited

U.S. PATENT DOCUMENTS

| | | | |
|---|---|---|---|
| 4,109,276 | 8/1978 | Hopkins, Jr. et al. | 375/371 |
| 4,259,694 | 3/1981 | Liao | 358/455 |
| 4,747,114 | 5/1988 | Martinez | 375/345 |
| 4,939,683 | 7/1990 | Van Heerden et al. | 708/212 |
| 5,216,554 | 6/1993 | Schneider | 360/51 |
| 5,259,006 | 11/1993 | Price et al. | 375/356 |
| 5,315,229 | 5/1994 | Markus | 322/28 |
| 5,493,589 | 2/1996 | Ibenthal | 375/372 |
| 5,513,139 | 4/1996 | Butler | 365/189.04 |
| 5,574,399 | 11/1996 | Oura et al. | |
| 5,579,120 | 11/1996 | Oguro | 386/94 |
| 5,588,025 | 12/1996 | Strolle et al. | 375/316 |
| 5,600,379 | 2/1997 | Wagner | 348/497 |
| 5,625,573 | 4/1997 | Kim | 364/514 |
| 5,832,038 | 11/1998 | Carsello | 375/316 |

FOREIGN PATENT DOCUMENTS

45097 10/1989 Japan .

OTHER PUBLICATIONS

S. Yoshida, "A New Coherent Demodulation Technique For Land–Mobile Satellite Communications," 1990 Autumn Nat'l Mtg. of the Institute of Electronics, Information and Communication Engineers, B–169.

Y. Matsumoto et al., "A Study on π/4–shift QPSK Coherent Detection Scheme," 1992, Autumn Mtg. of the Institute of Electronics, Information and Communication Engineers, B–241.

T. Sakata et al., "An Open Loop Coherent Detection Scheme," 1993, Autumn Mtg. of the Institute of Electronics, Information and Communication Engineers, B–300.

Y. Matsumoto et al., "A Low Power Demodulator LSIC for Personal Communications—High Performance Coherent Detection Demodulator–," Technical Report of IEICE, DSP94–18, RCS94–9 (1994–05).

*Primary Examiner*—Stephen Chin
*Assistant Examiner*—Chieh M. Fan
*Attorney, Agent, or Firm*—Rabin & Champagne P.C.

[57] ABSTRACT

A digital demodulator compensates for frequency offset between modulated and unmodulated carrier signals by detecting the frequency offset during a preamble with a known modulation pattern. Samples obtained during the preamble are stored in a memory during clock recovery, and read from the memory after the recovered clock signal has become stable. Phase offset is detected from a histogram of the phase differences between the two carrier signals, calculated modulo a certain phase angle, and compensation for phase offset is applied. The maximum histogram value is found by comparisons made according to a single-elimination tournament plan. In a diversity receiver, the maximum histogram value is used to select the output data.

32 Claims, 24 Drawing Sheets

| CONDITION | OUTPUT | |
|---|---|---|
| | C | AGBN |
| A>B | A | 0 |
| A≤B | B | 1 |

FIG.30

| dmax($\tau$) | BIT 3 | BIT 2 | BIT 1 | BIT 0 |
|---|---|---|---|---|
| | AGBNZ | AGBNY0 OR AGBNY1 | AGBNX0 AGBNX1 AGBNX2 OR AGBNX3 | AGBN01 AGBN23 AGBN45 AGBN67 AGBN89 AGBNAB AGBNCD OR AGBNEF |
| PW0 | 0 | 0 | 0 | 0 ⎫ AGBN |
| PW1 | 0 | 0 | 0 ⎫AGBN | 1 ⎭ 01 |
| PW2 | 0 | 0 | 1 ⎬ X0 | 0 ⎫ AGBN |
| PW3 | 0 | 0 ⎫AGBN | 1 ⎭ | 1 ⎭ 23 |
| PW4 | 0 | 1 ⎬ Y0 | 0 ⎫ | 0 ⎫ AGBN |
| PW5 | 0 | 1 | 0 ⎬AGBN | 1 ⎭ 45 |
| PW6 | 0 | 1 | 1 ⎬ X1 | 0 ⎫ AGBN |
| PW7 | 0 | 1 ⎭ | 1 ⎭ | 1 ⎭ 67 |
| PW8 | 1 | 0 ⎫ | 0 ⎫ | 0 ⎫ AGBN |
| PW9 | 1 | 0 | 0 ⎬AGBN | 1 ⎭ 89 |
| PWA | 1 | 0 | 1 ⎬ X2 | 0 ⎫ AGBN |
| PWB | 1 | 0 ⎬AGBN | 1 ⎭ | 1 ⎭ AB |
| PWC | 1 | 1 ⎬ Y1 | 0 ⎫ | 0 ⎫ AGBN |
| PWD | 1 | 1 | 0 ⎬AGBN | 1 ⎭ CD |
| PWE | 1 | 1 | 1 ⎬ X3 | 0 ⎫ AGBN |
| PWF | 1 | 1 ⎭ | 1 ⎭ | 1 ⎭ EF |

DIGITAL DEMODULATOR, MAXIMUM-VALUE SELECTOR, AND DIVERSITY RECEIVER

BACKGROUND OF THE INVENTION

The present invention relates to a digital demodulator for demodulating a signal modulated by phase-shift keying, to a diversity receiver employing this digital demodulator, and to a maximum-value selector employed in the digital demodulator.

Phase-shift keying (PSK) is a digital modulation system that is being increasingly adopted in mobile wireless communication systems, including microcellular automobile telephone systems and the Japanese personal handyphone system (PHS). PSK receivers have traditionally employed differential detection, which is comparatively resistant to fading, but in systems not subject to rapid fading, it is advantageous to employ coherent detection, which is more sensitive and allows a greater communication range for a given transmitting power.

Coherent PSK detectors commonly employ a carrier signal recovered from and therefore synchronized with the received PSK signal, but carrier recovery is an inherently complex process, requiring a large and expensive circuit that is unsuited for large-scale integration. Most carrier recovery circuits moreover include a feedback loop with a limited response speed, creating problems in communication systems that transmit in short bursts. An alternative method, proposed by two of the present inventors and disclosed in U.S. Pat. No. 5,574,399, performs coherent detection without carrier recovery by using a local carrier signal that is not synchronized with the transmitted carrier. The detected signal is rotated in the phase plane to correct for frequency offset and phase offset between the two carriers.

The present invention incorporates improved methods of detecting and compensating for these two types of offset. In detecting phase offset, the invention addresses the general problem of maximum-value selection, and obtains information useful in diversity reception.

SUMMARY OF THE INVENTION

One object of the present invention is to detect frequency offset from known preamble data intended for clock recovery, even though most of the preamble data are received before the recovered clock signal becomes stable.

Another object of the invention is to provide a large phase-noise margin in the detection of frequency offset.

Still another object is to adjust the detected frequency offset to compensate for frequency drift.

Yet another object is to detect phase offset accurately in the presence of phase noise.

A further object is to select a maximum value from a plurality of input values rapidly, without requiring an extra clock signal.

A still further object is to provide a rapid, inexpensive, and accurate method of selecting output data in a diversity receiver.

According to a first aspect of the invention, a digital demodulator recovers a clock signal having a certain clock period from a digitally modulated signal. The digital demodulator has a memory for storing sample values obtained from the digitally modulated signal before the recovered clock signal becomes stable. After the recovered clock signal becomes stable, sample values that were stored in the memory at intervals equal to the clock period are read from the memory and processed.

According to a second aspect of the invention, a digital demodulator receives a signal that has been modulated by phase-shift keying so as to transmit a preamble followed by an information section, and generates therefrom an instantaneous phase signal referenced to a locally-generated unmodulated signal. The digital demodulator has a frequency-offset detector that processes sample values of the instantaneous phase signal generated during the preamble, thereby detecting a frequency offset between the modulated and unmodulated signals. These sample values are preferably stored in and read from a memory as in the first aspect of the invention. By processing the sample values, the frequency-offset detector generates a frequency-offset compensation signal that changes at a rate responsive to the frequency offset. This frequency-offset compensation signal is combined with the instantaneous phase signal during the information section, thus compensating for the frequency offset.

According to a third aspect of the invention, a digital demodulator receives a signal modulated by phase-shift keying, and generates therefrom an instantaneous phase signal referenced to a locally-generated unmodulated signal. A modulo calculator calculates values of the instantaneous phase signal modulo a certain phase angle. A histogram calculator counts occurrences of these values to obtain a histogram. A maximum-count selector selects a value with a maximum count in the histogram, thus ignoring outlying values produced by noise. An arithmetic circuit generates a phase-offset compensation signal equal to a difference between the selected value and a nominal value. The phase-offset compensation signal is combined with the instantaneous phase signal to compensate for the phase offset, enabling received data to be obtained by coherent detection of the phase information in the modulated signal.

According to a fourth aspect of the invention, a maximum-value selector has comparators that operate according to a single-elimination tournament plan with multiple rounds, performing concurrent comparisons in each round, so that a final result is obtained quickly without the need for extra clock signals.

According to a fifth aspect of the invention, a diversity receiver has a plurality of receiving circuits, each incorporating a digital demodulator as described in the third aspect of the invention. The maximum counts selected by the maximum-count selectors in these digital demodulators are compared, and the received data generated by the digital demodulator producing the largest maximum count are selected as output data.

BRIEF DESCRIPTION OF THE DRAWINGS

The invention will be described by way of example with reference to the attached drawings, in which:

FIG. 30 is a table illustrating the operation of the second part of the invented maximum-value selector;

DETAILED DESCRIPTION OF THE INVENTION

Embodiments of the invented digital demodulator will be described first. These embodiments assume the use of a $\pi/4$-shifted differential quaternary phase-shift keying modulation scheme (often referred to as $\pi/4$-shift QPSK), in which two-bit values are encoded as phase shifts in a transmitted carrier signal according to Table 1. Each pair of bits is referred to as a symbol. The transmitted data are represented by the relative differences in phase from one symbol to the next.

TABLE 1

| Transmitted Data | Phase Shift (Radians) |
|---|---|
| 00 | $\pi/4$ |
| 01 | $3\pi/4$ |
| 10 | $-\pi/4$ |
| 11 | $-3\pi/4$ |

The first embodiment also assumes that communication takes place in bursts, and that at least some of these bursts begin with a preamble in which the data '100110011001 . . . ' are transmitted for the purpose of clock recovery. Many communication systems employ preambles of this type. The Japanese PHS system described in standard 28 of the Japanese Research and Development Center for Radio Systems (RCR-STD28) is one example. Bursts beginning with this type of preamble are generally referred to as control bursts or synchronizing bursts.

Figure 1:
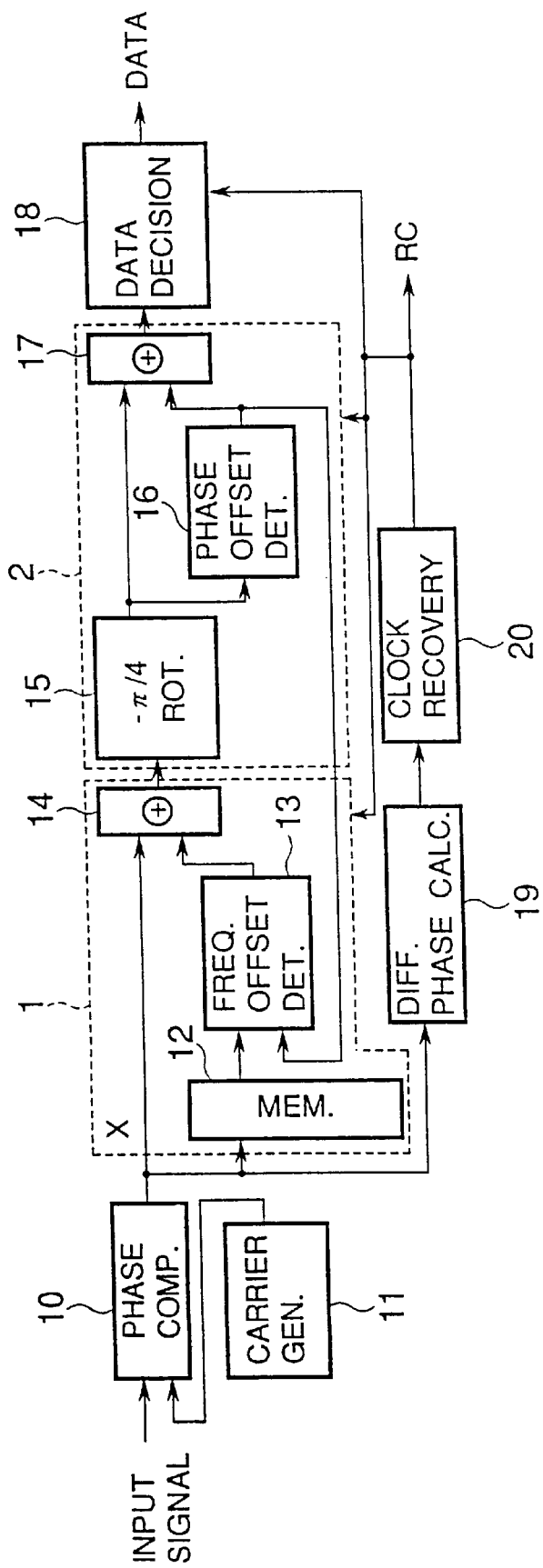
FIG. 1 is a block diagram of a first embodiment of the invented digital demodulator.

FIG. 1 illustrates the overall configuration of the first embodiment. Novel features are to be found in a frequency-offset compensation section 1 and a phase-offset compensation section 2.

The input signal is a carrier signal. modulated by $\pi/4$-shift QPSK. The modulated carrier signal. is received by a phase comparator 10 and compared with an unmodulated carrier signal generated by a carrier generator 11. The unmodulated carrier signal has the same nominal frequency as the modulated carrier signal, but is not locked in frequency or phase of the modulated carrier signal. Since the frequencies of the two carrier signals are only nominally equal, there will usually be a slight difference, referred to as a carrier frequency offset, between them.

The phase comparator 10 generates an instantaneous phase signal X representing the phase of the modulated carrier signal as referenced to the unmodulated carrier signal. The frequency-offset compensation section 1 rotates this phase by an amount that compensates for the carrier frequency offset. The frequency-offset compensation section 1 comprises a phase memory unit 12 that stores values of the instantaneous phase signal, a frequency-offset detector 13 that processes these values to produce a frequency-offset compensation signal, and an adder 14 that, combines the frequency-offset compensation signal with the instantaneous phase signal, thus operating as a frequency-offset corrector.

Next, the instantaneous phase signal undergoes two further phase rotations in the phase-offset compensation section 2. A $-\pi/4$ phase rotator 15 applies a reverse rotation through $\pi/4$ radians. This enables a phase-offset detector 16 to efficiently detect the phase offset between the modulated and unmodulated carrier signals, and generate a phase-offset compensation signal. An adder 17 then adds the phase-offset compensation signal to the instantaneous phase signal to rotate the instantaneous phase into a known set of nominal positions. The adder 17 operates as a phase-offset corrector.

After these phase rotations, the instantaneous phase signal is supplied to a data decision circuit 18 that determines the symbol values represented by the instantaneous phase signal, and outputs these symbol values as received data.

The instantaneous phase signal X output by the phase comparator 10 is also supplied to a differential phase calculator 19 and a clock recovery circuit 20. These circuits recover a clock signal RC having a frequency equal to the symbol rate in the modulated carrier signal, and a clock period equal to reciprocal of this symbol rate. The recovered clock signal RC is supplied to the frequency-offset compensation section 1, the phase-offset compensation section 2, the data decision circuit 18, and other circuits (not visible) that process the data output by the data decision circuit 18.

Figure 2:
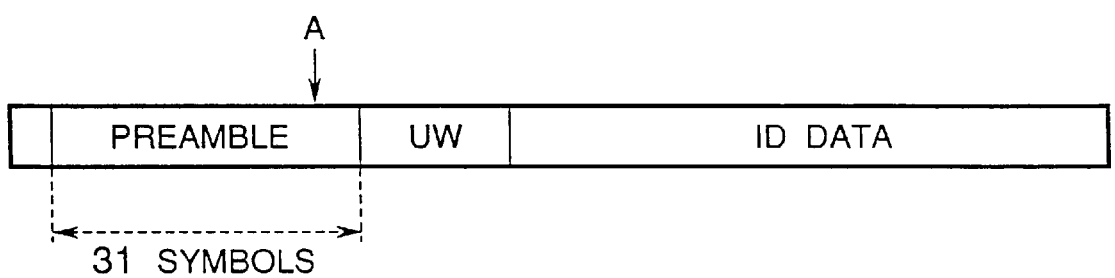
FIG. 2 illustrates a communication burst having a preamble.

FIG. 2 shows the data structure of the modulated carrier signal received by the first embodiment in a control burst or synchronizing burst. Such a burst comprises, for example, a 31-symbol preamble followed by an information section containing a unique word (UW), an identifier (ID), and other data. The preamble comprises repetitions of the fixed data sequence '100110011001. . . ' mentioned above.

In receiving a control or synchronizing burst, the first embodiment operates generally as follows. While the preamble is being received, the clock recovery circuit 20 synchronizes the recovered clock signal RC to the known pattern of preamble data. Synchronization is accomplished over a period of time, so the recovered clock RC is at first unstable, but becomes locked into synchronization at some point A during the preamble and remains stable thereafter. The phase memory unit 12 stores all values of the instantaneous phase signal X produced by the phase comparator 10 during an interval up to at least point A.

At a point near the end of the preamble, not before point A, the frequency-offset detector 13 reads data out of the phase memory unit 12. Working backward from the known symbol timing after point A, the frequency-offset detector 13 reads values that were stored at intervals equal to the recovered clock period. The frequency-offset detector 13 thus obtains samples of the instantaneous phase signal taken at substantially the center of each symbol, even in those symbols that were received before clock synchronization was acquired. This is one novel feature of the invention.

By processing the sample data read from the phase memory unit 12, the frequency-offset detector 13 determines the frequency offset between the modulated and unmodulated carrier signals, and generates a corresponding frequency-offset compensation signal. After the preamble ends, the adder 14 begins adding this frequency-offset compensation signal to the instantaneous phase signal. The adder 14 operates in synchronization with the recovered clock signal RC, generating one instantaneous phase value per clock period, at the center of each symbol interval.

After further rotation in the $-\pi/4$ phase rotator 15, if noise and fading effects are ignored, the instantaneous phase signal takes on four equally-spaced phase values. By means of a histogram analysis, the phase-offset detector 16 detects the phase offset between these four values and nominal values of $\pi/4$, $3\pi/4$, $-3\pi/4$, and $-\pi/4$ radians, and provides the adder 17 with a phase-offset compensation signal that cancels the phase offset.

The data decision circuit 18 thus obtains instantaneous phase values that have been accurately compensated for both frequency and phase offset between the modulated and unmodulated carrier signals, and is able to make accurate decisions about the nominal value represented by each instantaneous phase value. By decoding the differences between successive nominal values, the data decision circuit 18 recovers the transmitted symbol data. The decoding rule is given by Table 2.

TABLE 2

| Difference Between Values | Decoded Data |
|---|---|
| 0 | 00 |
| $\pi/2$ | 01 |
| $\pi$ | 11 |
| $-\pi/2$ | 10 |

Next, a more detailed description of the circuit configuration and operation of several parts of the first embodiment will be given.

Figure 3:
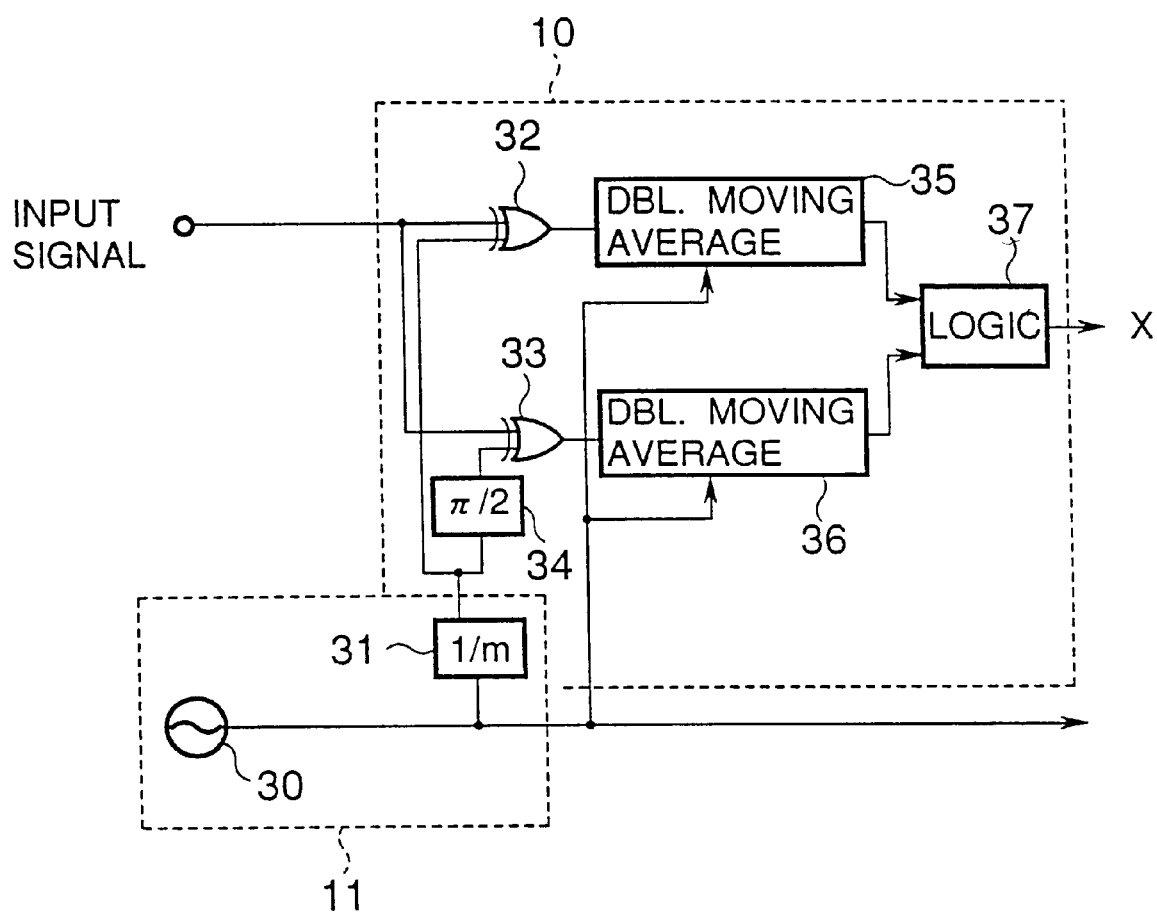
FIG. 3 is a block diagram of the phase comparator in FIG. 1.

FIG. 3 shows one preferred circuit configuration of the phase comparator 10 and carrier generator 11. The carrier generator 11 comprises a master oscillator 30 and a 1/m frequency divider 31. The master clock signal output by the master oscillator 30 is supplied to the phase comparator 10, and to other circuits as necessary. The frequency divider 31 divides the frequency of this master clock signal by m to create the unmodulated carrier signal.

The phase comparator 10 comprises a pair of exclusive-OR gates 31 and 32, a $\pi/2$ phase shifter 34, two double-moving-average filters 35 and 36, and a polarity logic circuit 37.

The modulated carrier signal is supplied to both exclusive-OR gates 32 and 33. Exclusive-OR gate 32 also receives the unmodulated carrier signal from the frequency divider 31, while exclusive-OR gate 33 receives an orthogonal carrier signal generated by the $\pi/2$ phase shifter 34 from the unmodulated carrier signal. The exclusive-OR gates 32 and 33 take the exclusive logical OR of their respective pairs of input signals and supply the resulting exclusive-OR signals to double-moving-average filters 35 and 36. The double-moving-average signals output by these double-moving-average filters 35 and 36 are combined as described later in the polarity logic circuit 37 to produce the instantaneous phase signal X.

Figure 4:
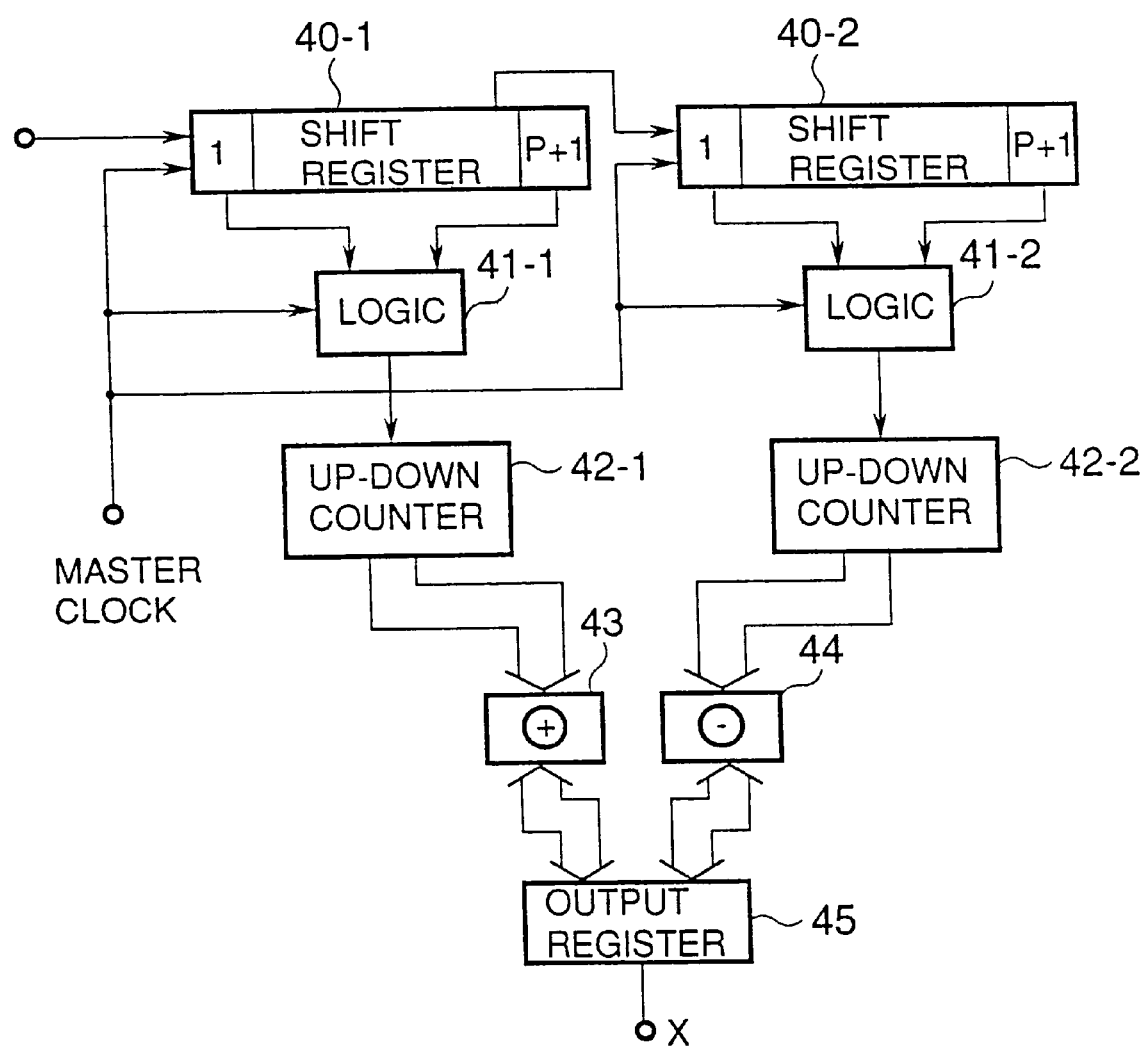
FIG. 4 is a block diagram of the double-moving-average filter employed in FIG. 3.

FIG. 4 shows one preferred circuit configuration of the double-moving-average filters 35 and 36. Each of these double-moving-average filters comprises a pair of (P+1)-stage shift registers 40-1 and 40-2, a pair of logic circuits 41-1 and 41-2, a pair of up-down counters 42-1 and 42-2, an adder 43, a subtractor 44, and an output register 45. P is a suitable positive integer.

The operation of the double-moving-average filter in FIG. 4 can be described as follows. The exclusive-OR signal from the corresponding exclusive-OR gate 32 or 33 in FIG. 3 is input to the first stage of shift register 40-1 and shifted through both shift registers 40-1 and 40-2 in synchronization with the master clock signal, entering shift register 40-2 from the P-th stage of shift register 40-1.

Up-down counter 42-1 indicates the number of "ones" in the most recent P bit values of the exclusive-OR signal. Logic circuit 41-1 controls up-down counter 42-1 according to the values shifted into and out of this P-bit interval, commanding the up-down counter to increment if a "one" was shifted in and a "zero" was shifted out, to decrement if a "zero" was shifted in and a "one" was shifted out, and to leave the count unchanged when the bits shifted in and out have the same value. Up-down counter 42-1 thus maintains a moving total of the exclusive-OR signal over the most recent P master clock cycles.

Logic circuit 41-2 and up-down counter 42-2 operate similarly. The value in up-down counter 42-2 represents a moving total over an interval of P master clock cycles ending just before the start of the most recent P master clock cycles.

The output register 45 contains a moving total of these moving totals, again over an interval of P master clock cycles. At each master clock cycle, the value in up-down counter 42-1 is added to the moving total, and the value in up-down counter 42-2 is subtracted. The possible values in output register 45 range from zero to $P^2$. Except for a scale factor, a moving total is the same as a moving average, so the value in output register 35 represents a double moving average: a moving average of moving averages.

If the frequency of the unmodulated carrier signal is f, then the master clock frequency is mf, and the duration of P master clock cycles is P/mf. This relation can be used to select the value of P that gives a desired moving-average interval.

Although the modulated and unmodulated carrier signals may be analog signals, the outputs of the exclusive-OR gates 32 and 33 and all subsequent circuits are digital signals. In particular, the instantaneous phase signal is a digital signal.

Figure 5:
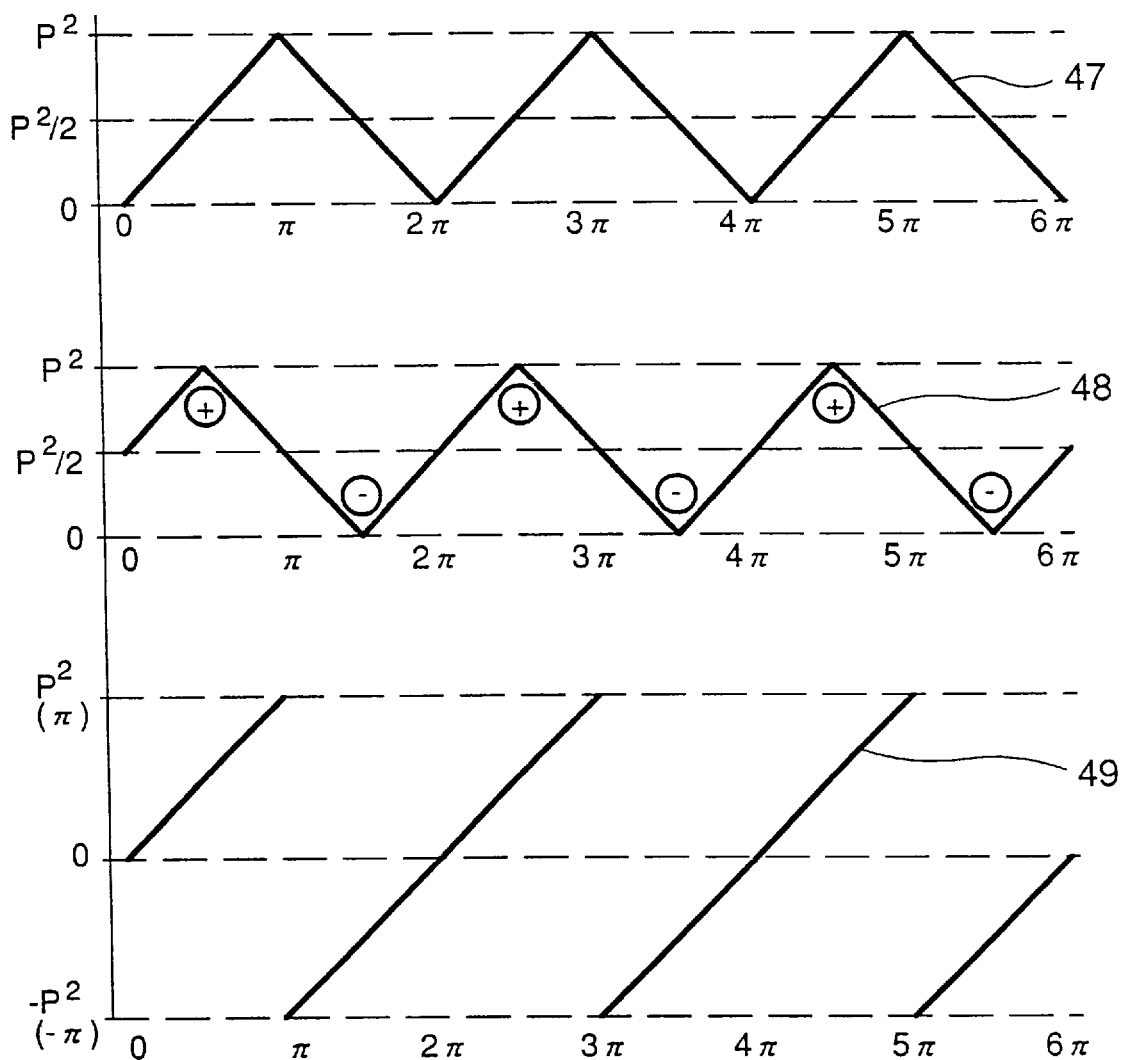
FIG. 5 is a timing diagram illustrating the operation of the phase comparator.

FIG. 5 illustrates the operation of the phase comparator 10 in FIG. 3 by showing the output 47 of double-moving-average filter 35, the output 48 of double-moving-average filter 36, and the output 49 of the polarity logic circuit 37. Signal 49 is the instantaneous phase signal X. The horizontal axis in FIG. 5 represents the phase difference between the modulated and unmodulated carrier signals. The vertical axis shows the corresponding values of output signals 47, 48, and 49 on independent scales.

The output of exclusive-OR gate 32 is always "zero" if the modulated and unmodulated carrier signals are in phase, is always "one" if the modulated and unmodulated carrier signals are out of phase by $\pi$ radians, and is a mixture of "zeros" and "ones" if the phase difference is between zero and $\pi$, the number of "ones" being proportional to the phase difference. The output signal 47 of moving-average-filter 35 varies linearly between zero and $P^2$ according to the phase difference. The output of moving-average-filter 36 is identical, but is shifted to the left by $\pi/2$, because of the $\pi/2$ phase shifter 34 in FIG. 3.

To produce the instantaneous phase signal 49, the logic circuit 37 attaches a sign bit to the output signal 47 of moving-average-filter 35, making the sign positive or negative according to whether the output signal 48 of moving-average-filter 36 is greater than or less than the middle value of $P^2/2$. As a result, the instantaneous phase signal 49 varies linearly from $-P^2$ to $+P^2$ over intervals of $2\pi$ (over the interval from $\pi$ to $3\pi$, for example, or from $3\pi$ to $5\pi$), and represents the signed phase of the modulated carrier signal, referenced to the unmodulated carrier signal. As noted in the drawing, $P^2$ and $-P^2$ are equivalent to phase angles of $\pi$ and $-\pi$.

The instantaneous phase signal 49 or X can also be treated as an unsigned value from zero to $2P^2$. In addition, the polarity logic circuit 37 may round the instantaneous phase signal X off by discarding one or more least significant bits. In the following description it will be assumed that the instantaneous phase signal X is output as a six-bit signal, representing phase angles from zero to $2\pi$ radians as integer values from zero to sixty-three. Thus phase angle is measured with a resolution of $\pi/32$. The invention is of course not limited to this particular phase-angle resolution.

Next, the structure and operation of the phase memory unit 12 will be described.

Figure 6:
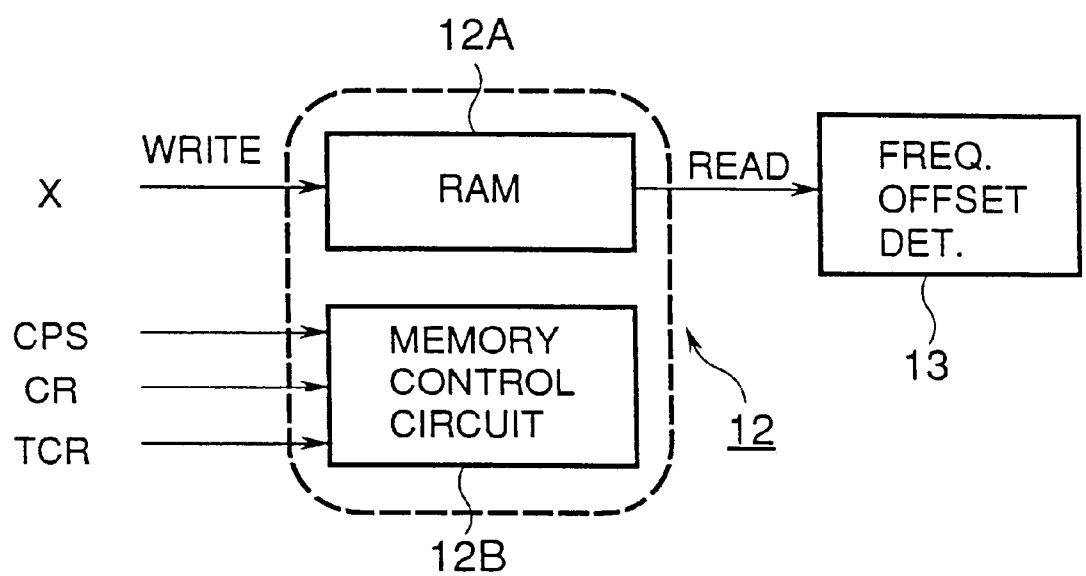
FIG. 6 is a block diagram of the phase memory in FIG. 1.

Referring to FIG. 6, the phase memory unit 12 comprises a random-access memory (RAM) 12A, and a memory controller 12B that controls access to the RAM 12A. The RAM 12A has sufficient capacity to store all values of the instantaneous phase signal received from the phase comparator 10 during, for example, a twenty-five-symbol portion of the preamble, or during the entire preamble, if necessary.

The memory control circuit 12B receives the recovered clock signal RC, a phase sampling clock SC, and a clock recovery timing signal TCR. The phase sampling clock SC is created by dividing the master clock frequency. Unity frequency division is permitted, in which case the phase sampling clock is the same as the master clock. The clock recovery timing signal TCR is asserted during part of the preamble, and held in the asserted state until at least the point A at which clock synchronization is acquired. A description of the circuits that generate the phase sampling clock and clock recovery timing signal will be omitted, as circuits of these types are well known.

Figure 7A:
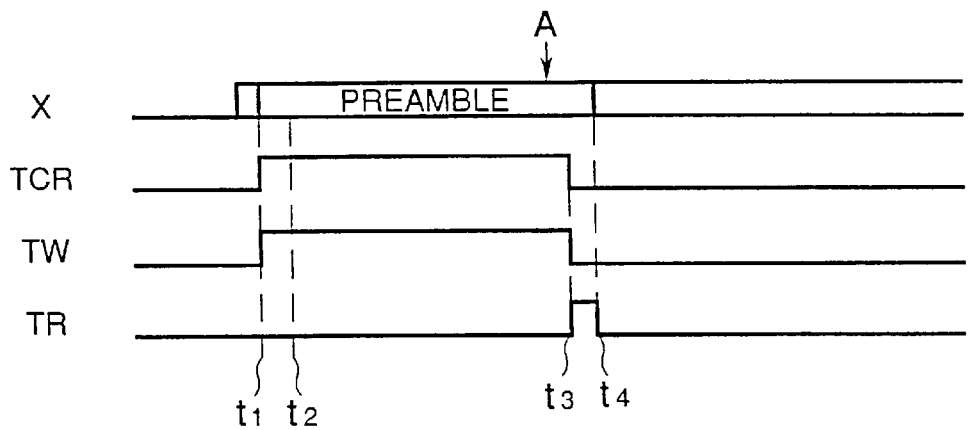
FIGS. 7A, 7B, and 7C are timing diagrams illustrating the operation of the phase memory.
Figure 7B:
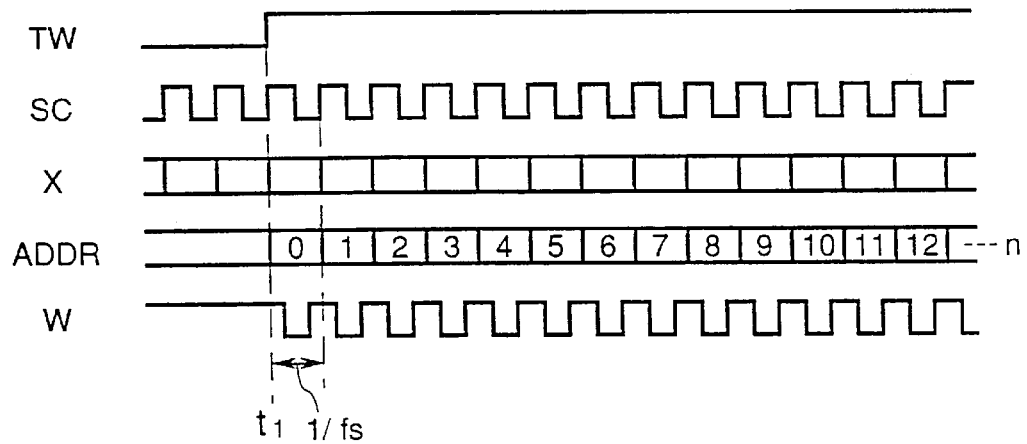
Figure 7C:
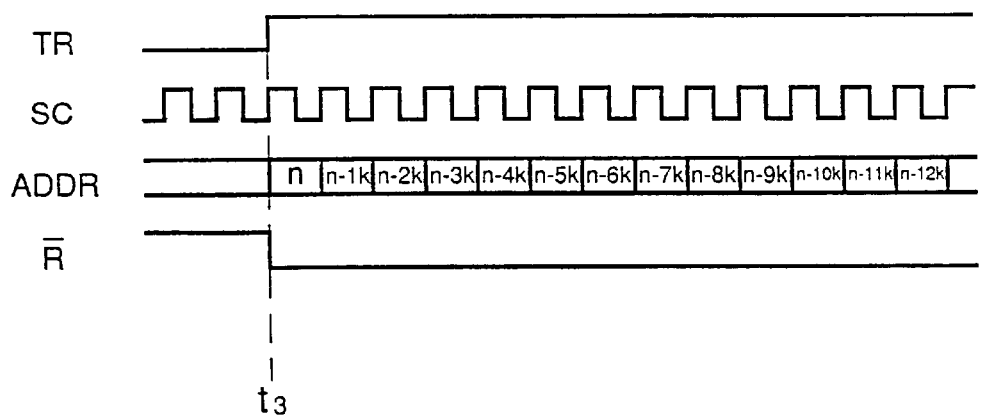

The frequency fs of the phase sampling clock SC is an integer multiple of the frequency fr of the recovered sample clock signal RC. This integer will be denoted by the letter k, so that $fs = k \times fr$ The memory control circuit 12B operates as illustrated in FIGS. 7A, 7B, and 7C. The symbols $t_1$, $t_2$, $t_3$, and $t_4$ designate four instants in the preamble in a control burst or synchronizing burst.

The clock recovery timing signal TCR is asserted from time $t_1$ to time $t_3$ FIG. 7A. In the drawing, time $t_1$ coincides with the beginning of the preamble. Time $t_3$ coincides with a valid transition of the recovered clock signal RC after point A, corresponding to the center of a symbol interval. The duration from $t_1$ to $t_3$ may be fixed or variable. A fixed duration is preferable from the standpoint of simplicity, provided that synchronization within a fixed duration can be assured.

The memory control circuit 12B generates an internal write timing signal TW that coincides with TCR, and an internal read timing signal TR that is asserted from time $t_3$ to time $t_4$. In the drawing, time $t_4$ coincides with the end of the preamble, but this is not a necessary condition; the read timing signal TR may be de-asserted before or after the end of the preamble. Instantaneous phase signal data X are written while TW is asserted, and read while TR is asserted.

Writing is controlled as shown in FIG. 7B, which is an enlargement of the interval from $t_1$ to $t_2$ in FIG. 7A. While the write timing signal TW is asserted, the memory control circuit 12B sends a series of address signals (ADDR) to the RAM 12A; the address values start at zero and increase by one address per cycle of the phase sampling clock SC. The memory control circuit 12B also sends the RAM 12A a write pulse signal W, causing the RAM 12A to store successive values of the instantaneous phase signal X at successive addresses. The letter n denotes the last address at which a value is stored, just before time $t_3$ in FIG. 7A.

Reading is controlled as shown in FIG. 7C, which is an enlargement of the first part of the interval from time $t_3$ to time $t_4$. While the read timing signal TR is asserted, the memory control circuit 12B asserts a read signal $\overline{R}$ that enables output from the RAM 12A, and generates a series of address values that start from n and decrease by k in every cycle of the phase sampling clock SC. The RAM 12A responds with output of the instantaneous phase signal values stored at addresses n, n−k, n−2k, n−3k, . . . These values represent the value of the instantaneous phase signal X at one-symbol intervals (intervals of 1/fr, equal to the recovered clock period) in the preamble. The values are read out in reverse order of time.

The number of values that can be read in this way depends on the location of time $t_3$ in the preamble, but it is not necessary to read an instantaneous phase value for every symbol in the preamble. The memory control circuit 12B preferably reads values for a fixed number of symbols, such as twenty-five of the thirty-one preamble symbols.

By reading the samples in synchronization with the phase sampling clock SC, which has a frequency k times higher than the frequency of the recovered clock RC, the memory control circuit 12B is able to read all of the necessary instantaneous phase values from the RAM 12A in time for the frequency-difference detector 13 to detect the carrier frequency offset by the end of the preamble, or shortly thereafter.

Next the detailed structure and operation of the frequency-offset detector 13 will be described.

As noted above, the frequency-offset detector 13 receives values of the instantaneous phase signal that are read from the RAM 12A in reverse order of time. In the interests of clarity, however, the frequency-offset detector 13 will first be described as receiving these values in the normal (forward) time order; then the modifications made to accommodate the reverse order will be described.

Figure 8:
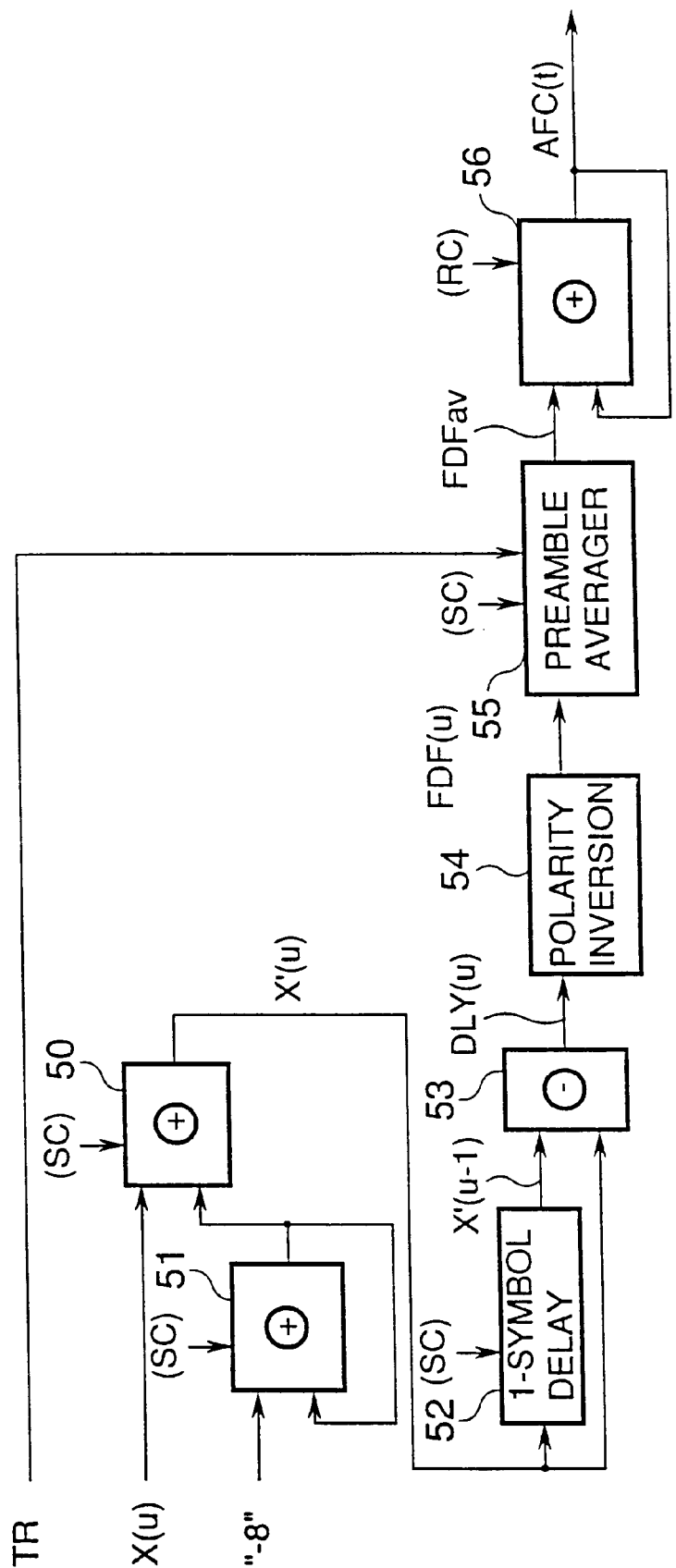
FIG. 8 is a block diagram of the frequency-offset detector in the first embodiment.

Referring to FIG. 8, the frequency-difference detector 13 comprises a pair of six-bit adders 50 and 51, a one-symbol delay circuit 52, a five-bit subtractor 53, a polarity inversion circuit 54, a preamble averager 55, and another six-bit adder 56. All of these circuits operate in synchronization with the phase sampling clock SC except for the adder 56, which operates in synchronization with the recovered clock RC. Cycles of the phase sampling clock signal SC will be denoted by the letter u, and the instantaneous phase data read from the RAM 12A will be denoted X(u).

The six-bit adders 50, 51, and 56 perform modulo-sixty-four arithmetic (because $2^6=64$), while the five-bit subtractor 53 performs modulo-thirty-two arithmetic ($2^5=32$). The preamble averager 55 preferably performs higher-precision arithmetic, such as ten-bit arithmetic. The preamble averager 55 performs arithmetic operations only while data are being read from the RAM 12A, as indicated by the read timing signal TR.

Adder 51 operates as an accumulator, the output of which begins at zero and decreases in fixed decrements of minus eight, equivalent to $-\pi/4$ radians, per clock cycle. Since the reversal of the time axis is being ignored in the present description, however, it will be temporarily assumed that the output of adder 51 increases by eight (equivalent to $\pi/4$ radians) per clock cycle, instead of decreasing. Adder 50 adds the output of adder 51 to the instantaneous phase value X(u) read from the RAM 12A, thereby adding successive multiples of eight to X(u) and producing values X'(u) equal, under the above temporary assumption, to X(u)+8u (modulo 64).

The one-symbol delay circuit 52 stores each value of X'(u) for one phase sampling clock period and outputs the stored value. The five-bit subtractor 53 takes the difference between the outputs of adder 50 and the one-symbol delay circuit 52, thereby obtaining the following quantity DLY(u).

$$DLY(u)=[X'(u)-X'(u-1)] \bmod 32$$

The modulo (mod) operation is carried out by disregarding the most significant bit of the six-bit values of X'(u) and X'(u−1). Other modulo operations described below are carried out similarly, by disregarding the appropriate number of most significant bits. DLY(u) is treated as a five-bit two's complement, that is, as an integer from −16 to +15. Twenty-five values are read from the RAM 12A (u=0 to 24), and twenty-four values of DLY(u) are obtained (u=1 to 24).

The polarity-inverting circuit 54 subtracts DLY(u) from zero, thereby obtaining a value FDF(u) equal to −DLY(u). The preamble averager 55 finds the average FDFav of the twenty-four values of FDF(u), and reduces this average FDFav to a five-bit integer value (a value modulo thirty-two).

$$FDFav=\{[FDF(1)+FDF(2)+\ldots+FDF(24)]/24\} \bmod 32$$

Once the value of FDFav has been calculated, it is output as a constant value to the six-bit adder 56, which outputs the frequency-offset compensation signal in synchronization with the recovered clock signal RC. The letter t will denote successive periods of the recovered clock signal RC, and the frequency-offset compensation signal will be denoted AFC (t). Once per clock period of the recovered clock signal RC, adder 56 adds FDFav to the previous value AFC(t−1) of the frequency-offset compensation signal to obtain the following new value:

$$AFC(t)=[AFC(t-1)+FDFav] \bmod 64$$

After the end of the preamble, adder 14 in FIG. 1 adds AFC(t) to the instantaneous phase signal X(t) at each period of the recovered clock signal RC, thereby performing the following operation:

$$X(t) \leftarrow [X(t)+AFC(t)] \bmod 64$$

Since AFC(t) changes at a rate of FDFav per symbol, this operation rotates X(t) in phase at a steady rate of FDFav per symbol, thereby compensating for the carrier frequency offset.

The operation of the frequency-offset detector 13 will next be explained with reference to FIGS. 9 to 14.

Figure 9:
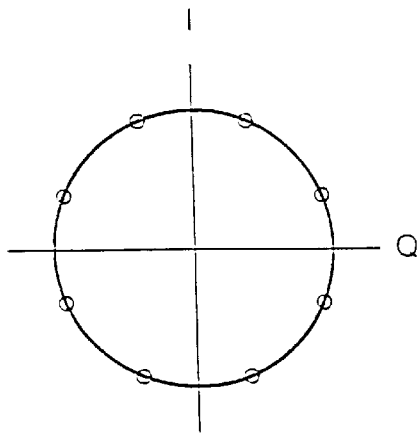
FIG. 9 illustrates a constellation of points in the phase plane.

Referring to FIG. 9, at the center of each symbol interval, the instantaneous phase signal nominally has one of eight values, which can be represented by a constellation of equally-spaced points on a unit circle in the phase plane. The I and Q axes in this plane are the in-phase and quadrature axes, corresponding to the phase alignments of the unmodulated carrier signals received by exclusive-OR gates 32 and 33, respectively, in FIG. 3. Since the modulated and unmodulated carrier signals are not synchronized, the eight-point constellation can have an arbitrary orientation with respect to the I and Q axes.

Figure 10:
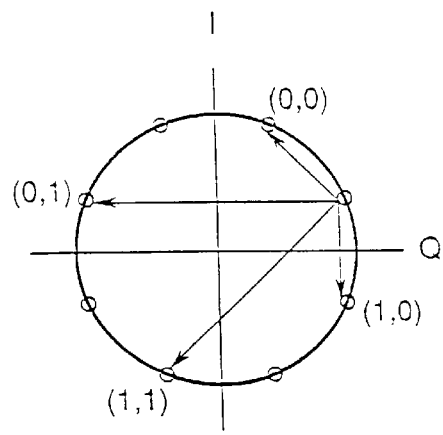
FIG. 10 illustrates phase shifts in a quaternary PSK modulation system.

Symbol values are represented differentially, as changes in instantaneous phase from one symbol to the next, according to the scheme given in Table 1. FIG. 10 illustrates the scheme pictorially. The symbol '01' is represented by a shift of 3 $\pi/4$ in phase, while '10' is represented by a shift of $-\pi/4$.

Figure 11:
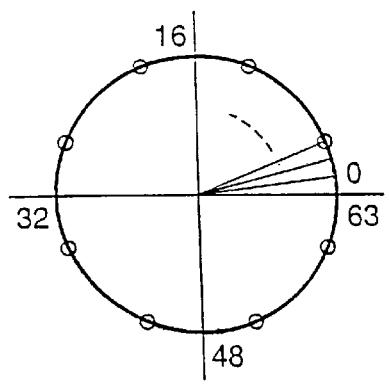
FIG. 11 illustrates the effect of a carrier frequency offset.

When there is a frequency offset between the modulated and unmodulated carrier signals, the constellation of points shown in FIGS. 9 and 10 rotates as indicated in FIG. 11. The rotation is clockwise or counterclockwise depending on whether the modulated carrier signal has a higher or lower frequency than the unmodulated carrier signal. The values from zero to sixty-three shown on the axes in FIG. 11 correspond to the six-bit values of the instantaneous phase signal X(t).

In addition to the rotation due to carrier frequency offset, there will also be random fluctuations due to phase noise in the communication channel.

Figure 12:
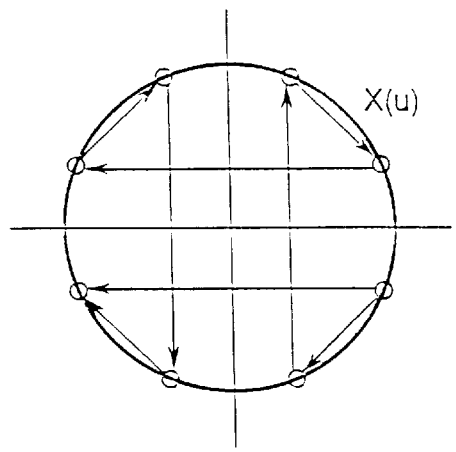
FIG. 12 illustrates preamble phase transitions.

FIG. 12 shows the phase shifts produced by the preamble pattern '100110011001 . . . ' when there is no frequency offset or phase noise. The instantaneous phase signal X(t), and the data X(u) read from the RAM 12A, move cyclically through all eight points in the stationary phase constellation.

Figure 13:
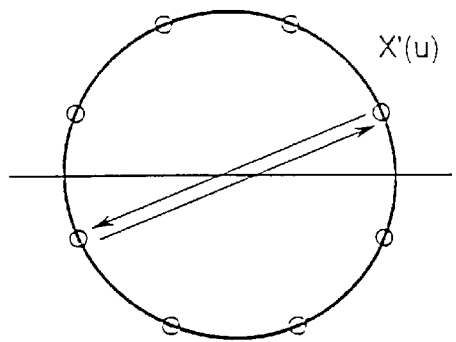
FIG. 13 illustrates preamble phase transitions after a reverse $\pi/4$ phase shift.

FIG. 13 shows the result of adding successive multiples of eight, equivalent to successive multiples of $\pi/4$, to X(u) in the preamble. The phase shift of $-\pi/4$ in X(u) corresponding to '10' becomes a phase shift of zero in X'(u), while the phase change of $3\pi/4$ in X(u) corresponding to '01' becomes a phase change of $\pi$ in X'(u). X'(u) therefore shuttles back and forth between just two values separated by $\pi$ radians, as in binary phase-shift keying (BPSK). In the present embodiment, in the absence of frequency offset and phase noise, X'(u) and X'(u−1) are either numerically identical or differ by thirty-two. When their difference DLY(u) is calculated modulo thirty-two by the five-bit subtractor 53, the result is nominally zero, any departures from zero being due to frequency offset or phase noise.

Since the purpose of the frequency-offset compensation signal AFC(t) is to cancel such departures, the polarity-inverting circuit 54 reverses the sign of the difference. Since phase noise is random, it tends to average out to zero in the output of the preamble averager 55, so FDFav has substantially the correct magnitude to compensate for the rotation due to carrier frequency offset.

As FIGS. 12 and 13 show, by converting X(u) to X'(u), the frequency-offset detector 13 reduces the number of instantaneous phase values from eight to two. The advantage of this is as follows.

Figure 14:
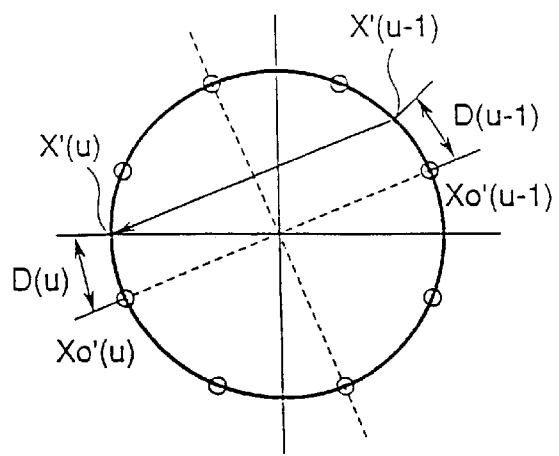
FIG. 14 illustrates the transitions in FIG. 13 in the presence of phase noise.

FIG. 14 shows an example in which phase noise is present in addition to a frequency offset. D(u−1) and D(u) represent a combination of frequency offset and phase noise, causing the values X'(u−1) and X'(u) output by adder 50 to differ from the nominal values $X_0'$(u−1) and $X_0'$(u). The value of DLY(u) is calculated as follows:

$$DLY(u) = [X'(u) - X'(u-1)] \mod 32$$
$$= \{[X_0'(u) + D(u)] - [X_0'(u-1) + D(u-1)]\} \mod 32$$
$$= \{[X_0'(u) - X_0'(u-1)] + [D(u) - D(u-1)]\} \mod 32$$
$$= \{0 + [D(u) - D(u-1)]\} \mod 32$$
$$= [D(u) - D(u-1)] \mod 32$$

Since DLY(u) takes on values from −16 to +15, the above calculation will be performed correctly if $$|D(u)-D(u-1)|<16.$$

The preamble averager 55 will accordingly receive correct inputs if the combined effect of carrier frequency offset and phase noise on the value of DLY(u) has an absolute magnitude less than sixteen, equivalent to $\pi/2$ radians. The carrier frequency offset is normally small, so most of this value of sixteen is a phase-noise margin.

After the preamble, X'(u) is not restricted to the two points shown in FIG. 13, and can change by nominal shifts of zero, sixteen, thirty-two, and forty-eight, representing arbitrary data. If the frequency offset were to be detected from these arbitrary data, DLY(u) would have to be calculated modulo sixteen instead of modulo thirty-two, and the phase-noise margin would be limited by the following more stringent inequality:

$$|D(u)-D(u-1)|<8$$

If the frequency offset were to be detected directly from X(u), without conversion to X'(u), then since X(u) shifts in nominal multiples of eight, DLY(u) would have to be calculated modulo eight, and the phase-noise margin would be even more stringently limited, as expressed by the following inequality:

$$|D(u)-D(u-1)|<4$$

Modulo-thirty-two calculations provide twice as much phase-noise margin as do modulo-sixteen calculations, and four times as much margin as do modulo-eight calculations. Converting X(u) to X'(u), and restricting the operation of the preamble averager 55 to the preamble, thus provides significantly increased phase-noise immunity in the detection of carrier frequency offset.

The above description has ignored the fact that the values of X(u) are read in reverse order from the RAM 12A. To allow for this reversal of the time axis, the fixed input to adder 51 is minus eight, as shown in the drawing (equivalent to fifty-six modulo sixty-four, or to $-\pi/4$ radians), and the polarity-inversion circuit 54 is omitted. Alternatively, the polarity-inversion circuit 54 may be retained if the value of DLY(u) is calculated as follows:

$$DLY(u)=[X'(u-1)-X'(u)] \mod 32$$

Next the detailed structure and operation of the phase-offset compensation section 2 will be described.

The $-\pi/4$ phase rotator 15 comprises a pair of adders similar to adders 50 and 51 in FIG. 8, which add successive multiples of minus eight ($-\pi/4$ radians) to the output of adder 14. The resulting instantaneous phase signal, output by the $-\pi/4$ phase rotator 15, will be denoted REVSFT(t).

REVSFT(t) nominally takes on four equally-spaced phase values, separated by intervals of $\pi/2$ radians. Since the effects of carrier frequency offset have been removed, these four values remain substantially stationary in the I-Q phase plane, but due to phase offset between the modulated and unmodulated carrier signals, the four values may still be located at arbitrary positions with respect to the I and Q axes. The function of the phase-offset compensation section 2 is to enable coherent detection by rotating REVSFT(t) so that it takes on nominal values equivalent to $\pi/4$, $3\pi/4$, $-3\pi/4$, and $-\pi/4$ radians.

Figure 15:
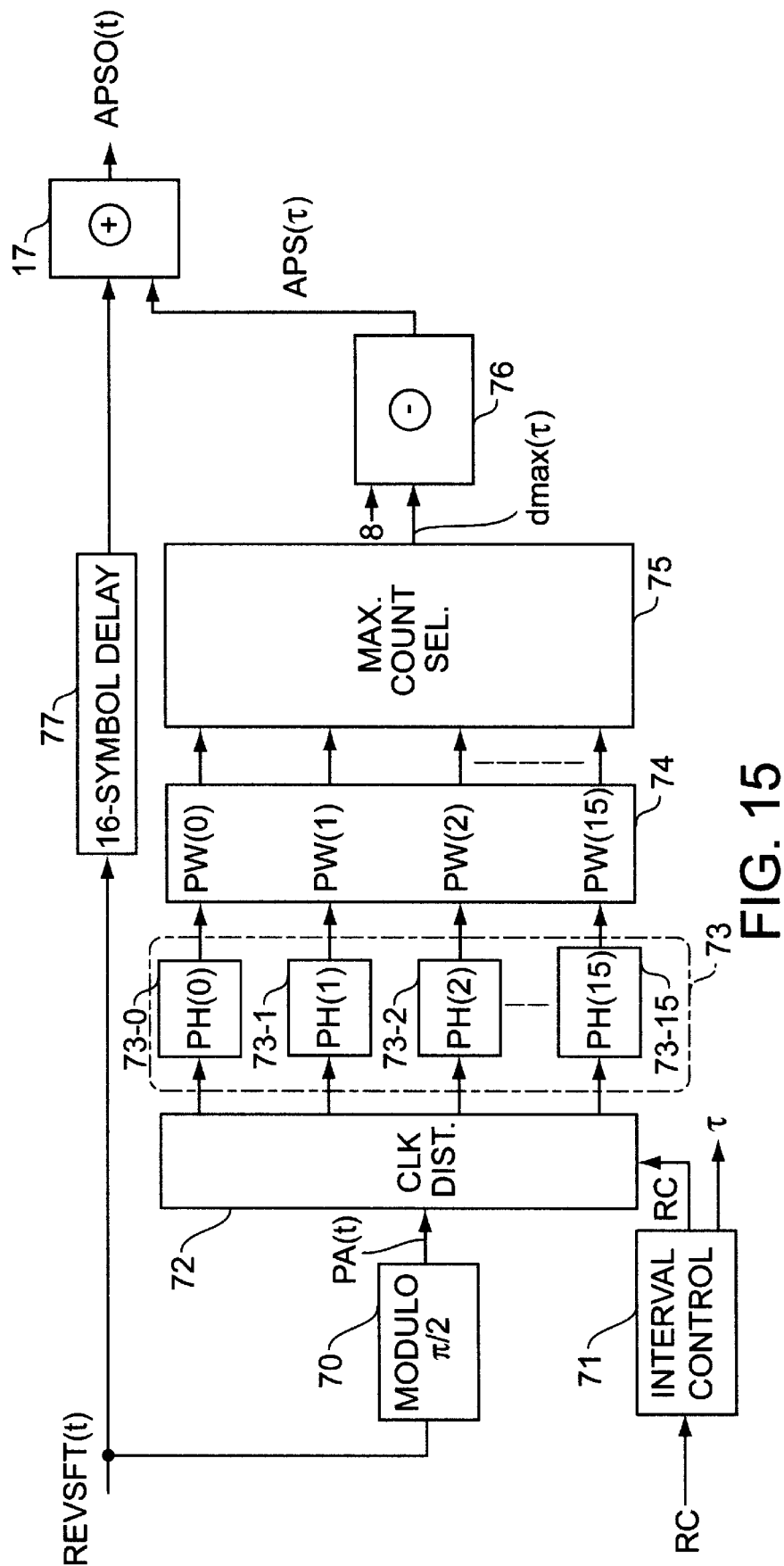
FIG. 15 is a block diagram of the phase-offset detector in the first embodiment.

Referring to FIG. 15, the phase-offset detector 16 comprises a modulo calculator 70, an interval control circuit 71, a clock distributor 72, a histogram calculator 73, a histogram enhancer 74, a maximum-count selector 75, a six-bit subtractor 76, and a sixteen-symbol delay circuit 77. The adder 17 adds the outputs of the six-bit subtractor 76 and sixteen-symbol delay circuit 77.

The modulo calculator 70 calculates the value of REVSFT(t) modulo sixteen (equivalent to $\pi/2$ radians), and supplies the resulting value to the clock distributor 72. In effect, the modulo calculator 70 collapses the four quadrants of the I-Q phase plane onto the single quadrant from 0 to $\pi/2$. The output of the modulo calculator 70 is a four-bit signal denoted PA(t).

The interval control circuit 71 receives the recovered clock signal RC, supplies RC to the clock distributor 72, divides the frequency of RC by sixteen to generate an interval clock signal $\tau$, and supplies $\tau$ to the histogram processing circuits 73 and 74, maximum-count selector 75, and six-bit subtractor 76.

The histogram calculator 73 comprises sixteen four-bit counters 73-0 to 73-15, which count occurrences of each of the sixteen values (zero to fifteen) that PA(t) can assume. These counters are reset to zero at intervals of sixteen symbols, by input of the interval clock signal $\tau$.

If the current value of PA(t) is d, the clock distributor 72 sends the recovered clock signal RC to counter 73-d, causing counter 73-d to increment. The count held in counter 73-d (the number of occurrences of value d) will be denoted PH(d) below.

Figure 16A:
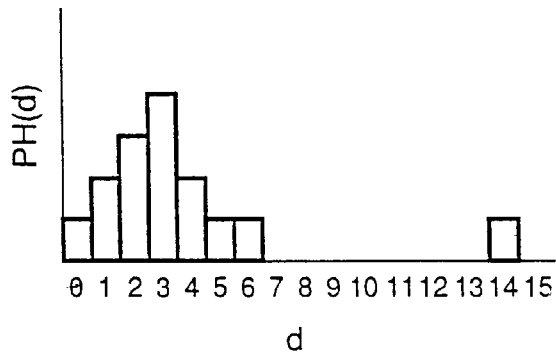
FIGS. 16A and 16B show two examples of histograms obtained by the histogram calculators in FIG. 15.

After fifteen recovered clock periods, the counters constituting the histogram calculator 73 indicate the distribution of values of PA(t) during these fifteen cycles. The histogram calculator 73 thus holds occurrence count data of the type shown in FIGS. 16A and 16B. FIG. 16A shows a histogram with a unique maximum count, whereas the histogram in FIG. 16B has two equal maximum counts.

The histogram enhancer 74 modifies the occurrence counts by replacing each count with a weighted sum of the occurrence counts of several adjacent values. These weighted sums can take on a wider range of values than can the count data PW(d) themselves, so the likelihood of two or more equal maximum counts is reduced. In the present embodiment, the weighted sum is the sum of the occurrence counts of seven values centered on the value being converted. In general, the counts of at least three adjacent values must be used. Either equal or unequal weighting can be employed; examples of both types of weighting will be given next. The enhanced count values output by the histogram enhancer 74 will be denoted PW(d) (d=0, . . . , 15).

An unequal weighting scheme with successively doubling weights is given by the following equation:

$$PW(d)=8\times PH(d)+4\times[PH(d-1)+PH(d+1)]+2\times[PH(d-2)+PH(d+2)]+1\times[PH(d-3)+PH(d+3)]$$

Since d varies from zero to fifteen, if d−n<0, then d−n+16 is used instead of d−n, and if 15<d+n, then d+n−16 is used instead of d+n (where n is 1, 2, or 3).

Figure 16B:
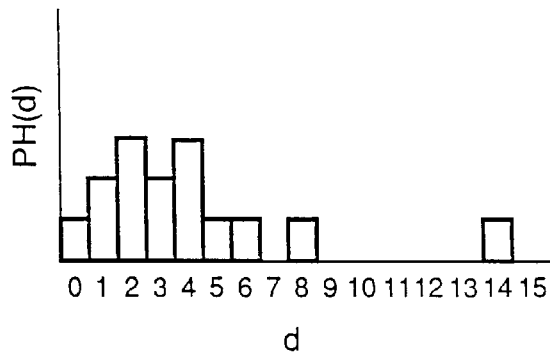
Figure 17A:
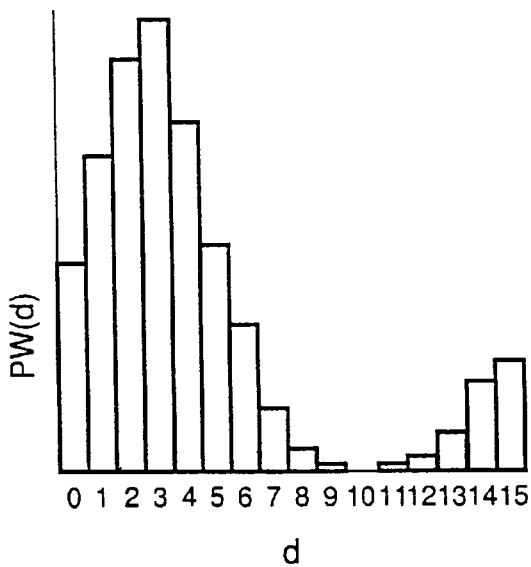
FIGS. 17A and 17B illustrate one method of enhancing these histograms.
Figure 17B:
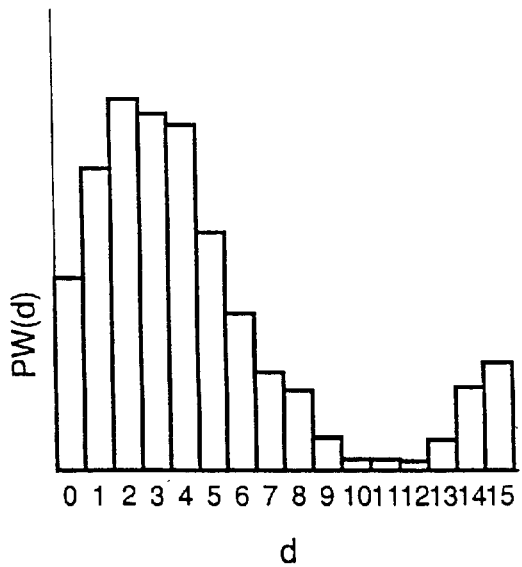

This unequally-weighted enhancement converts the histograms in FIGS. 16A and 16B to the histograms shown in FIGS. 17A and 17B, respectively. The histograms in FIGS. 17A and 17B both have unique maximum values.

An equal weighting scheme is given by the equation $$PW(d)=PH(d)+[PH(d-1)+PH(d+1)]+[PH(d-2)+PH(d+2)]+[PH(d-3)+PH(d+3)]$$

Figure 18A:
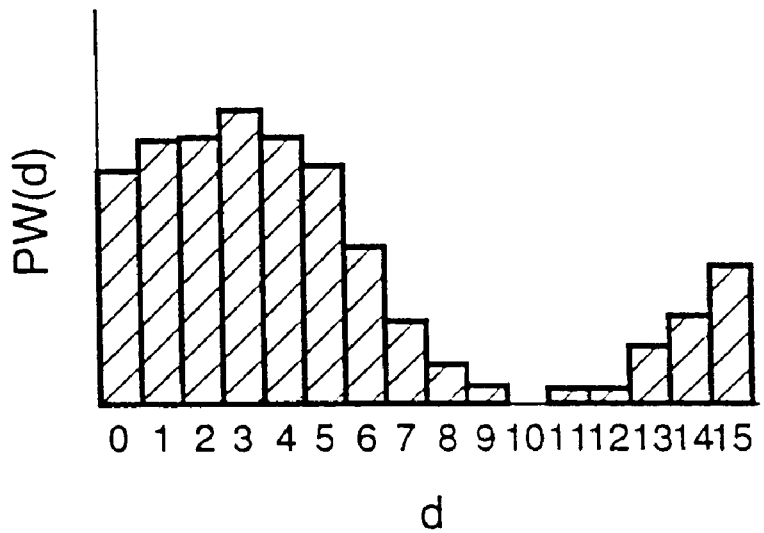
FIGS. 18A and 18B illustrate another method of enhancing these histograms.
Figure 18B:
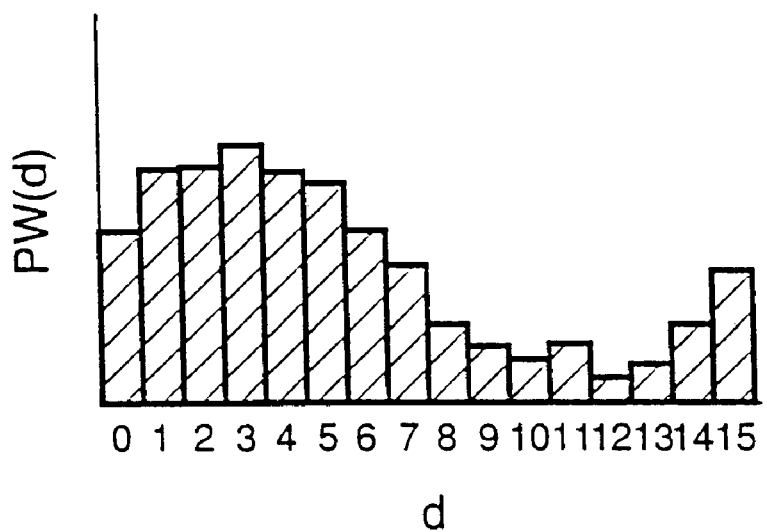

This equally-weighted enhancement converts the histograms in FIGS. 16A and 16B to the histograms in FIGS. 18A and 18B, respectively. The histograms in FIGS. 18A and 18B also have unique maximum values.

The weighting schemes given above are just two of many possible examples. The invention is not limited to any one particular scheme.

Even after histogram enhancement, there may remain two or more equal maximum counts, but such ties are resolved in the maximum-count selector 75 as described later.

The histogram enhancer 74 comprises, for example, sixteen seven-bit arithmetic circuits that carry out the above enhancement operations on all sixteen histogram values simultaneously.

The maximum-count selector 75 finds a value of d having the maximum count among the enhanced counts PW(d) output by the histogram enhancer 74, and furnishes this value, denoted dmax($\tau$) to the six-bit subtractor 76. The value of dmax($\tau$) is obtained during the last of the sixteen recovered clock periods making up one $\tau$ cycle.

The six-bit subtractor 76 latches the value of APS($\tau$) at the end of each $\tau$ cycle, and outputs, during the next $\tau$ cycle, a phase-offset compensation signal APS($\tau$) equivalent to $\pi/4$ radians minus the value selected by the maximum-count selector 75 as having the maximum occurrence count. Since $\pi/4$ is equivalent to eight, APS($\tau$) is calculated as follows:

$$APS(\tau)=[8-dmax(\tau)]\bmod 16$$

The sixteen-symbol delay circuit 77 delays the instantaneous phase signal REVSFT(t) to compensate for the histogram processing delay. The delay circuit 77 is a sixteen-stage shift register, for example. (The delay circuit 77 was omitted for the sake of simplicity in FIG. 1.)

Adder 17 is a six-bit adder that adds APS($\tau$) to the delayed instantaneous phase signal REVSFT(t), thereby rotating the instantaneous phase signal during sixteen RC clock periods by an amount determined from the histogram constructed during those same clock periods. The value APSO(t) output by adder 17 is calculated as follows.

$$APSO(t)=[REVSFT(t)+APS(\pi)]\bmod 64$$

Figure 19:
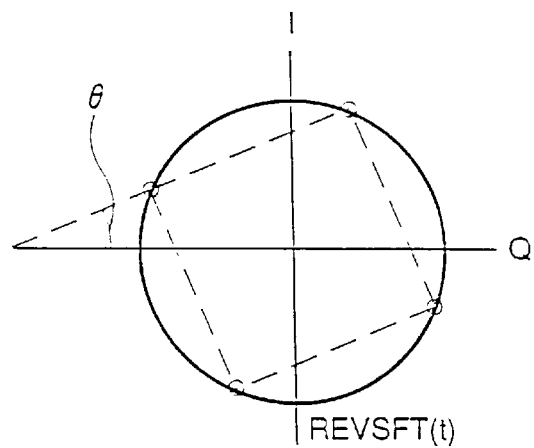
FIG. 19 illustrates the effect of a carrier phase offset.
Figure 20:
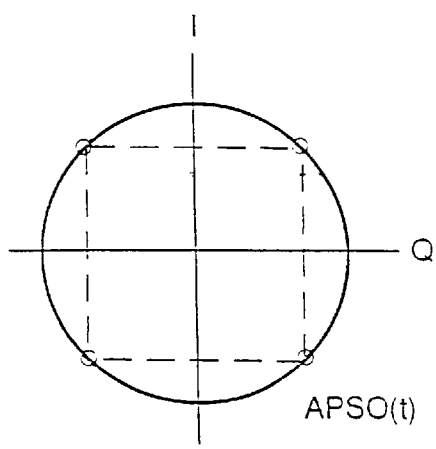
FIG. 20 illustrates the effect of phase-offset compensation.

FIGS. 19 and 20 illustrate the operation of the phase-offset compensation section 2. The values of the REVSFT(t) signal cluster about four positions as shown in FIG. 19, forming a square tilted at an arbitrary angle $\theta$ to the I and Q axes. Addition of APS($\tau$) to REVSFT(t) in adder 17 rotates REVSFT(t) by this angle $\theta$, so that the rotated signal APSO(t) clusters about the four values shown in FIG. 20, equivalent to $\pi/4$, 3 $\pi/4$, −3 $\pi/4$, and −$\pi/4$.

The data decision circuit 18 is accordingly able to operate by first assigning the values or the instantaneous phase signal APSO(t) to the closest of the four points in FIG. 20, then decoding transitions among these points differentially per Table 2. Since the four points are centered in their respective quadrants, the data decision circuit 18 only has to determine the quadrant each value of APSO(t) belongs to, as indicated by the most significant two bits of APSO(t), and decode shifts among the quadrants.

An advantage of the histogram method of finding the phase offset, as opposed to conventional averaging methods, is that an average can be significantly perturbed by a few outlying values, such as might be caused by random phase noise. The phase-offset detector 16, however, finds the value with the maximum histogram count and ignores values that are widely separated from the maximum-count value. The phase-offset detector 16 accordingly has a high degree of noise immunity.

By detecting carrier frequency during the preamble and by detecting phase offset at all times, the first embodiment is able to detect the carrier frequency offset accurately, to track variations in the phase offset, and to produce an accurately and sensitively demodulated data signal despite the presence of phase noise. There is still room for improvement, however, in two regards.

One regard is that during the preamble, the carrier frequency will generally not be detected with perfect accuracy, and in any case, frequency drift in oscillators at the transmitter and receiver may cause the carrier frequency offset to vary over time. As a result, the instantaneous phase signal output by the frequency-offset compensation section 1 may still tend to rotate slowly in one direction or the other in the phase plane.

Improvements in this regard are particularly necessary in systems that employ long preambles only at the outset of communications, or only at infrequent intervals. Mobile communication systems, for example, often divide the allotted frequency spectrum into control channels, used to initiate communication, and traffic channels, used for transmitting the actual message data constituting the communication. Control bursts contain a long preamble, but traffic bursts generally do not.

Figure 21:
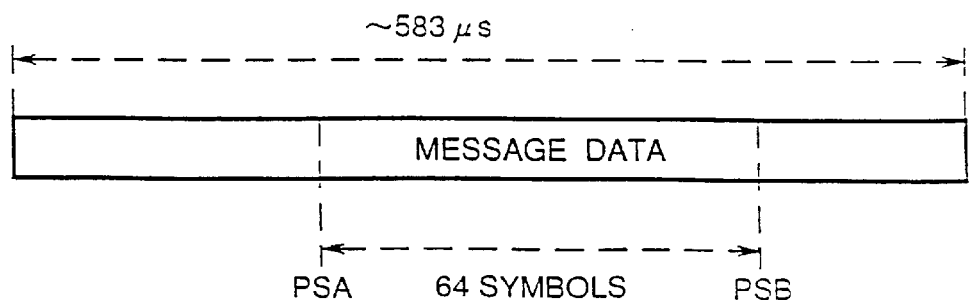
FIG. 21 illustrates a traffic burst.

FIG. 21 shows an example of a communication burst in a traffic channel in a typical time-division system. Frames with a duration of approximately 583 $\mu s$ are divided into sixty-four-symbol slots assigned to different communicating stations. PSA and PSB denote the carrier phase offsets at the beginning and end of one of these slots. Each slot is an information section consisting entirely, or almost entirely, of message data. At most, only a few preamble symbols are provided, not enough for the detection of carrier-frequency offset. The first embodiment adjusts the phase-offset compensation signal during bursts of this type, referred to below as traffic bursts, but is unable to adjust the frequency-offset compensation signal.

The other matter requiring improvement concerns the detection of carrier-phase offset. Since the four quadrants of the phase plane are collapsed onto one quadrant when the phase histogram is calculated, there is an ambiguity in the result: it is not known which quadrant the phase offset belongs in. The first embodiment resolves this ambiguity by arbitrarily placing the phase offset in the first quadrant. This is satisfactory as long as the true phase offset remains in the same quadrant, but if the phase offset moves from one quadrant to another, the phase-offset compensation section will apply an incorrect correction when the phase offset crosses a quadrant boundary, causing a data error.

The second embodiment has the general configuration shown in FIG. 1, except that the phase offset found by the phase-offset detector 16 is fed back to the frequency-offset detector 13. The internal structure of the frequency-offset detector 13 and phase-offset detector 16 also differs from the first embodiment.

Figure 22:
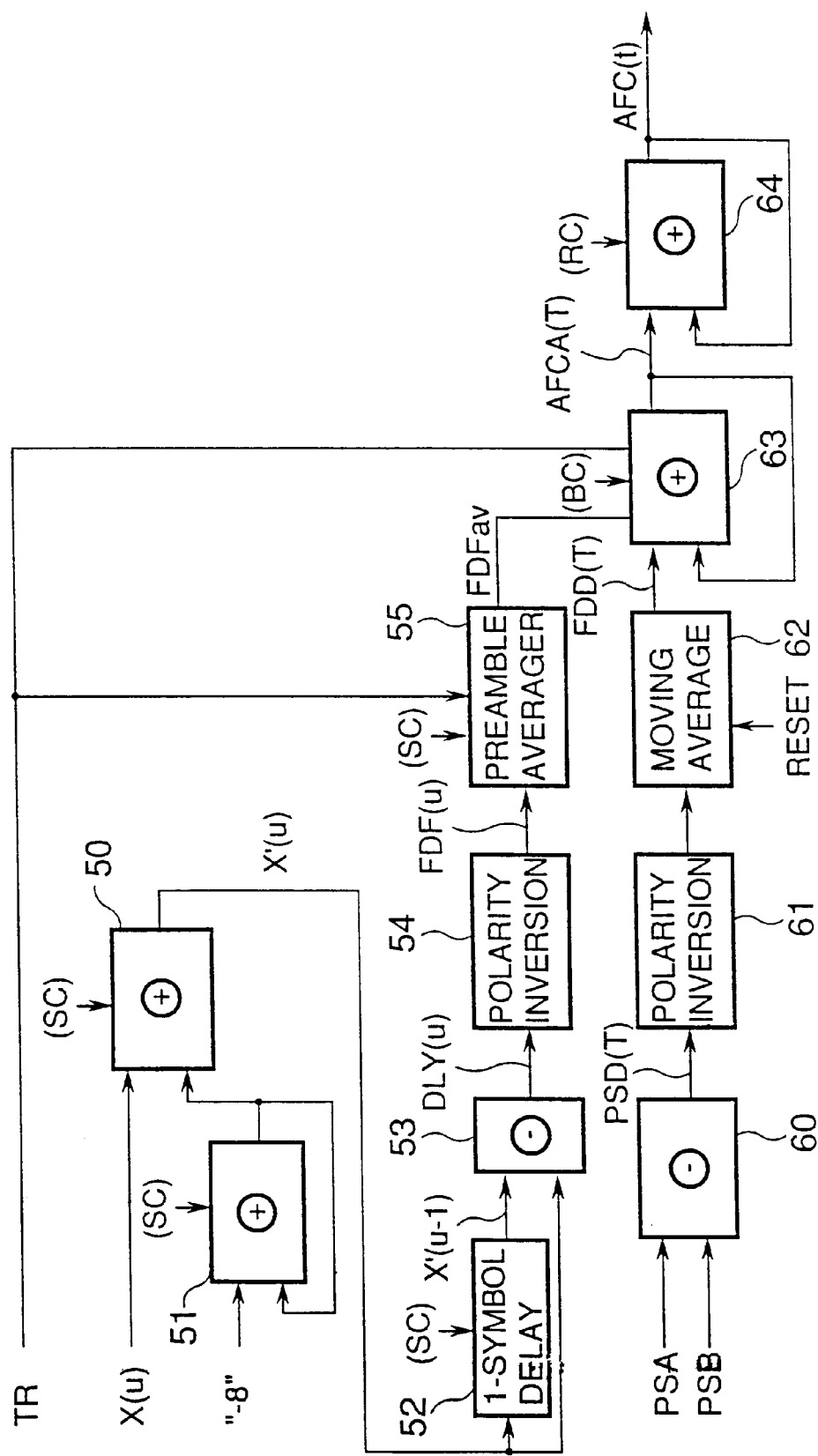
FIG. 22 is a block diagram of the frequency-offset detector in a second embodiment of the invented digital demodulator.

FIG. 22 shows the structure of the frequency-offset detector 13 in the second embodiment, using the same reference numerals as in FIG. 8 for identical elements. The description will be confined to the new elements, which are a subtractor 60, a polarity-inverting circuit 61, a moving-average circuit 62, and a pair of adders 63 and 64. Adders 63 and 64 replace adder 56 in the frequency-offset detector 13 of the first embodiment.

Subtractor 60 receives the carrier phase offsets PSA and PSB detected by the phase-offset detector 16 at the beginning and end of a sixty-four symbol burst of the type shown in FIG. 21, and calculates their difference. If the letter T denotes a burst clock signal that increments once per burst, then subtractor 60 finds the following difference PSD(T):

$$PSD(T)=[PSB(T)-PSA(T)]\bmod 64$$

The burst clock is also denoted BC in the drawing.

Since the object is to cancel the difference PSD(T), the polarity-inverting circuit 61 inverts the polarity of the signal input signal PSD(T), and furnishes the inverted signal −PSD(T) to the moving-average circuit 62. The moving-average circuit 62 has eight registers for holding eight successive values of −PSD(T), and arithmetic and logic circuits that calculate a per-symbol moving average FDD(T) from the eight values. The eight registers are reset to zero at the beginning of the first traffic burst. The first per-symbol moving average FDD(T) is obtained after the eighth traffic burst, and thereafter a new value of FDD(T) is obtained at each traffic burst. Since each burst comprises sixty-four symbols, the per-symbol average over the eight bursts is calculated by dividing by five hundred twelve (64×8=512), as follows:

$$FDD(T)=-[PSD(T)+PSD(T-1)+\ldots+PSD(T-7)]/512$$

Adder 63 operates as an accumulator, the output AFCA(T) of which is adjusted by the above value FDD(T) once per burst clock cycle. Adder 63 is initialized to the value FDFav supplied from the preamble averager 55, at a timing given in relation to the phase-memory read timing signal TR. At the eighth traffic burst and each subsequent traffic burst, adder 63 performs the following calculation.

$$AFCA(T)=[AFCA(T-1)+FDD(T)]\bmod 64$$

Adder 64 also operates as an accumulator, the output AFC(t) of which is increased by AFCA(T) at each recovered clock (RC) cycle. Adder 64 performs the following calculation:

$$AFC(t)=[AFC(t-1)+AFCA(T)]\bmod 64$$

Next, the principle of operation of the frequency-offset detector 13 in the second embodiment will be described.

If the value FDFav detected by the preamble averager 56 does not represent the exact carrier frequency offset, the angle θ in FIG. 19 will not remain constant, but will increase or decrease over time. The change of the phase offset, which will be denoted Δθ (t), is related to the residual carrier frequency offset Δf by the following equation, in which c is a constant.

$$\Delta\theta(t)=c\cdot\Delta f\cdot t$$

This equation shows that the residual carrier frequency offset can be found from the value of Δθ(t).

The quantity FDD(T) corresponds to the residual carrier frequency offset. By adding this quantity to FDFav, the frequency-offset detector 13 in the second embodiment is able to make an accurate carrier-frequency offset correction even if the original calculation of FDFav was not perfectly accurate, and even if the carrier frequency offset varies from time to time.

Incidentally, although the second embodiment assumes that FDFav is calculated from instantaneous phase data stored in the phase memory unit 12, as in the first embodiment, the frequency-offset detector 13 in the second embodiment is also applicable in digital demodulators lacking a phase memory unit. In a communication system not employing control or synchronizing bursts, for example, AFCA(T) can be initialized to zero, or to some other predetermined offset value, then adjusted on the basis of information fed back from the phase-offset compensation section 2.

Next the phase-offset detector 16 in the second embodiment will be described.

Figure 23:
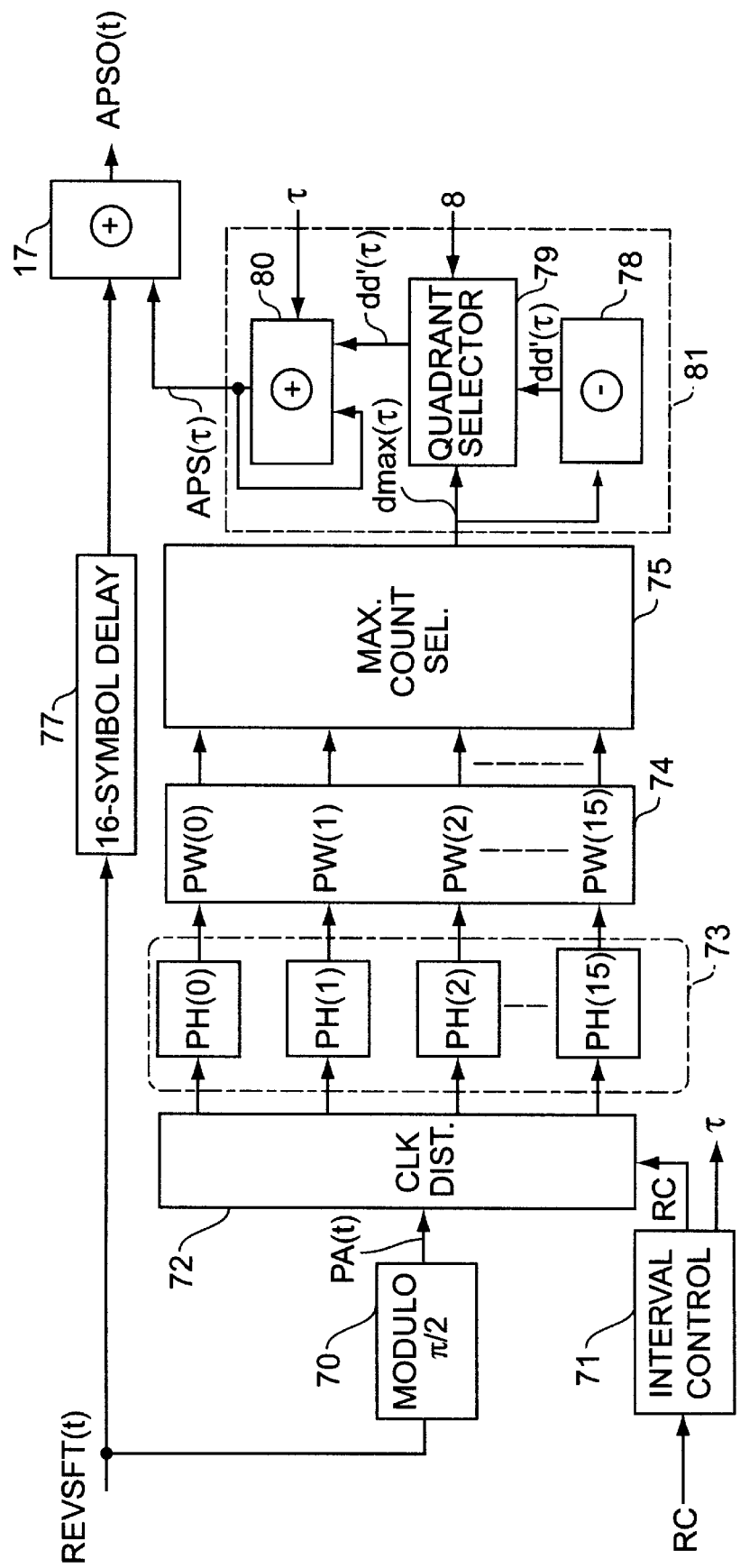
FIG. 23 is a block diagram of the phase-offset detector in the second embodiment.

FIG. 23 shows the structure of the phase-offset detector 16, using the same reference numerals as in FIG. 15 for identical elements. The difference between FIGS. 15 and 23 is that the six-bit subtractor 76 of the first embodiment has been replaced by a subtractor 78, a quadrant selector 79, and a six-bit adder 80, these elements constituting an arithmetic circuit 81.

The subtractor 78 calculates the change dd(τ) in the phase offset dmax(τ) output by the maximum-count selector 75 from one cycle of sixteen symbols (one τ cycle) to the next, as follows:

$$dd(\tau)=[d\max(\tau)-d\max(\tau-1)]\bmod 32$$

The quadrant selector 79 receives dmax(τ) and dd(τ), and modifies the former according to the latter to produce an internal value d'max(τ), calculated as follows.

If $|dd(\tau)|<8$ then $d'\max(\tau)=d\max(\tau)$

If $|dd(\tau)|\geq 8$ and $8\leq d\max(\tau-1)<16$ then $d'\max(\tau)=d\max(\tau)+16$ If $|dd(\tau)|\geq 8$ and $0\leq d\max(\tau-1)<8$ then $d'\max(\tau)=d\max(\tau)-16$ The initial value of dmax(τ) is eight. After obtaining d'max(τ), the quadrant selector 79 calculates and outputs the following quantity dd'(τ).

$$dd'(\tau)=[d\max(\tau-1)-d'\max(\tau)]\bmod 64$$

Adder 80 operates as an accumulator, adding successive values of dd'(τ) to an initial value of zero to produce the phase-offset compensation signal APS(τ) supplied to adder 17. Thus, $$APS(\tau)=[APS(\tau-1)+dd'(\tau)] \bmod 64$$

The operation of the phase-offset detector 16 in the second embodiment will be described with reference to FIGS. 24 and 25. A description of histogram operations, which are the same as in the first embodiment, will be omitted. It will be assumed that the values of τ start from zero but that the first value of dmax(τ) is obtained from the maximum-count selector 75 when τ=1. Initially, dmax(0)=8 and APS(0)=0. It will be further assumed that dmax(1) has a positive value (from one to fifteen), so that dd(1)<8 and d'max(1) is equal to dmax(1). APS(1) is then calculated as follows.

$$APS(1) = [APS(0) + dd'(1)] \bmod 64$$
$$= 0 + [dmax(0) - d'max(1)] \bmod 64$$
$$= 0 + [8 - dmax(1)] \bmod 64$$

The resulting value of APS(1) is the same as in the first embodiment. Thereafter, as long as dmax(τ) differs from dmax(τ−1) by less than eight, as illustrated in FIG. 24, d'max(τ) will be the same as dmax(τ), dd'(τ) will be the same as dd(τ), APS(τ) will be adjusted by an amount equal to the difference between dmax(τ) and dmax(τ−1), and APS(τ) will continue to match the first embodiment.

Figure 24:
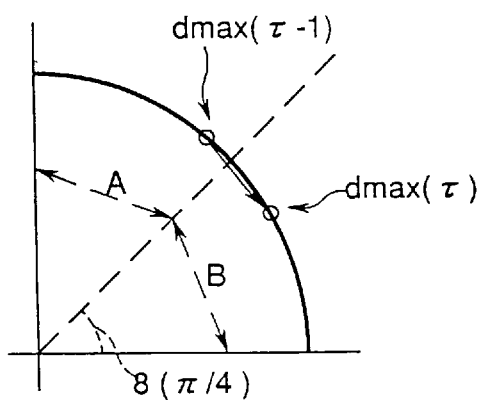
FIG. 24 illustrates a change in phase offset within the same quadrant in the phase plane.
Figure 25:
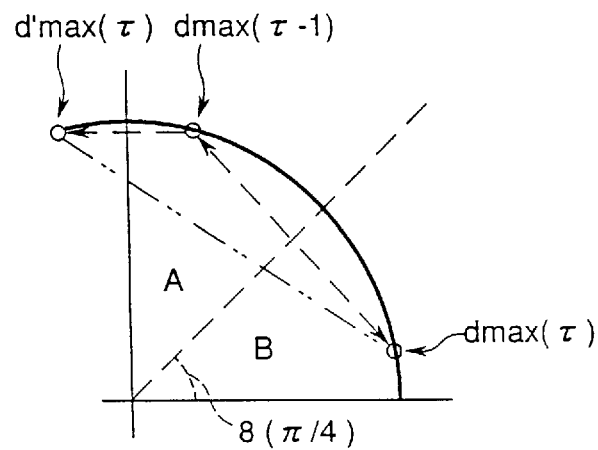
FIG. 25 illustrates a change in phase offset from one quadrant to another quadrant in the phase plane.

Areas A and B in FIG. 24 are defined by the conditions 8≦dmax(τ)<16 and 0≦dmax(τ)<8. Because only values from zero to fifteen are counted in the histogram processing, dmax(τ) is confined to areas A and B. While the difference between dmax(τ) and dmax(τ−1) remains less then eight, dmax(τ) can move about within area A or B or move between areas A and B without changing the way in which APS(τ) is calculated.

If dmax(τ) differs by eight or more from dmax(τ−1), however, then dmax(τ) is replaced in the calculations by the value d'max(τ), which differs from dmax(τ−1) by eight or less. FIG. 25 shows a case in which the conditions |dd(τ)|≧8 and 8 ≦dmax(τ−1)<16 are true, so that d'max(τ) is equal to dmax(τ)+16. In this case, it is more likely that the actual phase offset has made a small counterclockwise shift from dmax(τ−1) to d'max(τ) than a large clockwise jump from dmax(τ−1) to dmax(τ). The apparent large clockwise motion is likely to be an artifact of the collapsing of four quadrants onto one quadrant when the histogram was calculated.

Since dd'(τ) is calculated from d'max(τ), the addition of dd'(τ) in adder 80 in this case adjusts the phase-offset compensation signal APS(τ) by the small difference between d'max(τ) and dmax(τ−1), rather than the large difference between dmax(τ) and dmax(τ−1). That is, the second embodiment treats the true phase offset as having moved counterclockwise into the adjacent quadrant.

If dmax(τ) is in area B instead of area A, then when the difference between dmax(τ) and dmax(τ−1) is eight or more, d'max(τ) is equal to dmax(τ)−16 and the true phase offset is treated as having moved clockwise into the next adjacent quadrant. In either case, the direction of motion is chosen so as to minimize the absolute size of the change in the phase-offset compensation signal APS(τ). The second embodiment, that is, resolves the ambiguity concerning the quadrant in which the phase offset belongs by assuming that the phase offset always changes in steps of eight (equivalent to π/4 radians) or less.

If a real change in phase offset exceeding π/4 radians occurs, the signal disruption is so great that even with proper phase compensation, there would be little chance of recovering correct data. The assumption that the phase offset does not change by more than π/4 radians per burst can thus be made with little risk of extra data errors.

If dmax(1) is equal to zero, then d'max(1) is sixteen, dd'(1) becomes minus eight instead of plus eight, and APS(1) changes to zero instead of sixteen. This makes a difference only in the initial quadrant occupied by the phase-offset compensation signal, and not in subsequent changes in the phase-offset compensation value.

The overall operation of the arithmetic circuit 81 can be summarized as follows.

$$APS(\tau)=[E-dmax(\tau)]\bmod 64 \quad E=8, 24, 40, \text{ or } 56|APS(\tau)-APS(\tau-1)|<8$$

In the first embodiment, dmax(τ) was subtracted from a fixed nominal value of eight, but in the second embodiment, dmax(τ) is subtracted from a selected one of four nominal values differing by multiples of sixteen (equivalent to π/2 radians), the selection being made so that successive values of the phase-offset compensation signal APS(τ) do not differ by more than eight (equivalent to π/4 radians).

As described above, the second embodiment can track changes in the phase offset correctly even when the phase offset crosses a quadrant boundary. Since the phase offset APS(τ) is fed back to the frequency-offset detector 13 for use in adjusting the frequency-offset compensation signal, the accuracy of both phase and frequency offset compensation is improved. The function of detecting and compensating for frequency offset is thus shared by the frequency-offset detector 13 and phase-offset detector 16.

Next, the maximum-count selector 75 employed in both of the preceding embodiments will be described. For purposes of comparison, first a conventional maximum-value selector will be described.

Figure 26:
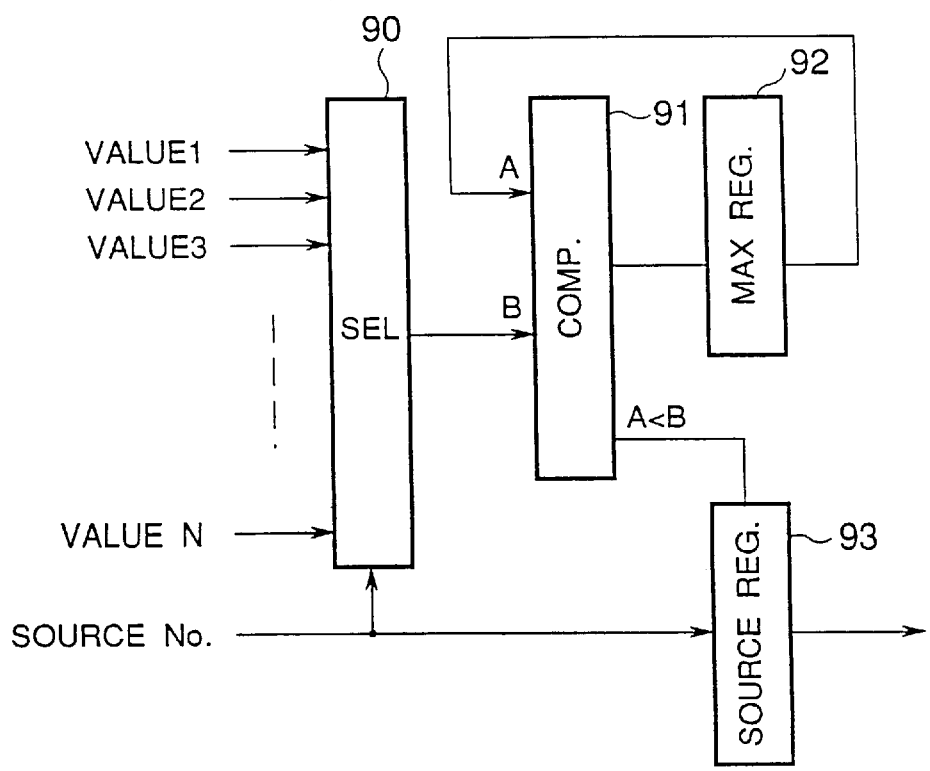
FIG. 26 is a block diagram of a conventional maximum-value selector.

Referring to FIG. 26, the conventional maximum-value selector has N input sources at which N numerical values are received. In the context of the present digital demodulator, these input sources receive the enhanced histogram counts produced by the histogram enhancer 74. A selector 90 selects the input sources in turn, responsive to a source number (SOURCE NO.) selection signal, and supplies the selected value B to a comparator 91. Comparator 91 compares B with a current maximum value A stored in a maximum-value register (MAX REG) 92. The value of A is initially zero, but whenever A<B, A is replaced by the value of B. Furthermore, when A<B, the comparator 91 sends a write pulse signal to a source register 93, which responds by storing the current source number. After all sources have been selected, the source register 93 holds the source number of a source from which the maximum value was received.

One problem with the conventional maximum-value selector is that when there are many input sources, it takes time to obtain the final result. In the present digital demodulator, another problem is that the comparisons would need to be made in synchronization with a special clock signal, having a frequency higher than the recovered clock signal.

Figure 27:
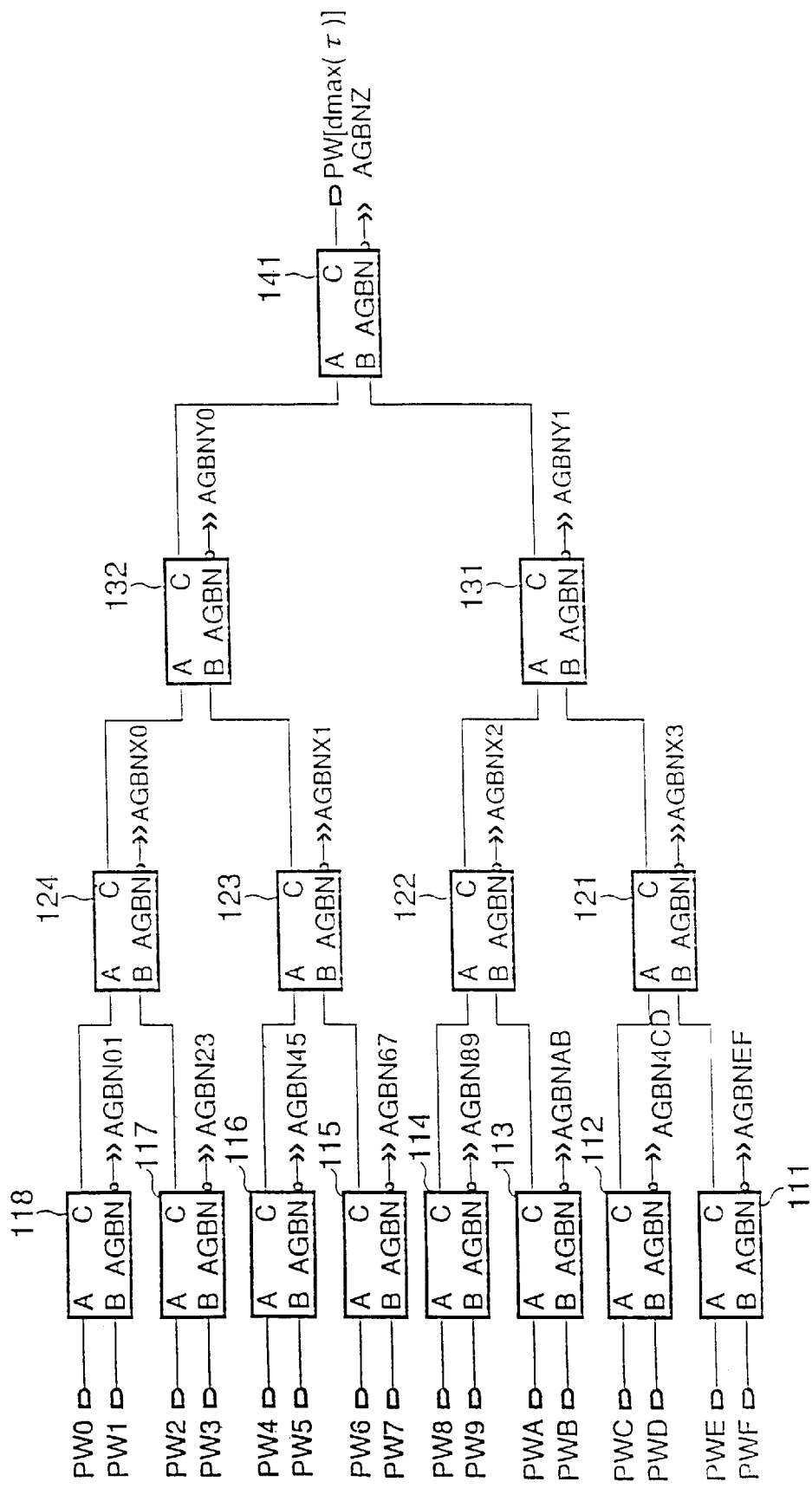
FIG. 27 is a block diagram of a first part of the invented maximum-value selector.

The novel maximum-count selector 75 comprises a comparison section and a result output section. FIG. 27 shows the comparison section, which comprises comparators 111 to 141, organized on the plan of a four-round single-elimination tournament. Each comparator receives a pair of input values A and B, and produces an output value C equal to A or B, together with a result signal. AGBN indicating which input value became the output value. The eight comparators 111 to 118 in the first round receive the enhanced histogram counts PW(0) to PW(15), which are now denoted PW0 to PWF. The four comparators 121 to 124 in the second round receive the C output values of the first-round comparators. The two comparators 131 and 132 in the third round receiving the C output values of the second-round comparators. The fourth-round comparator 141 receives the C output values of the third-round comparators. The result signals from different comparators are given different designations in the drawing, from AGBN01 to AGBNZ.

Figures 28A, 28B:
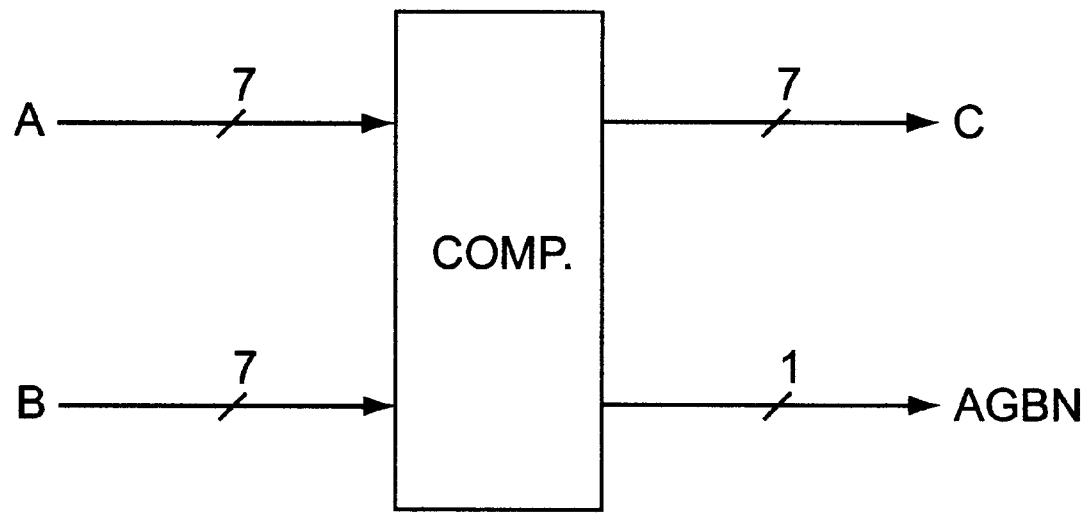
FIG. 28A illustrates the inputs and outputs of the comparators in FIG. 27.
FIG. 28B indicates the values of the outputs in FIG. 28A.

FIG. 28A shows the inputs and outputs of the comparators 111, . . . , 141. A, B, and C are seven-bit values, while AGBN is a one-bit signal. FIG. 28B describes the operation of these comparators, showing that C is equal to the larger of A and B, AGBN is equal to "zero" when A>B, and AGBN is equal to "one" when A≦B.

From FIGS. 27, 28A, and 28B it can be seen that the largest of all the input values will survive all four rounds of comparison, being output by one comparator in each round. In particular, the C output of comparator 141 will be this largest input value, equal to PW[dmax(τ)] in the notation of the embodiments above.

If the enhanced histogram in the invented digital demodulator has two identical maximum count values, the tie is automatically resolved in favor of the value with the lower position in FIG. 27. If PWE and PWF are equal, for example, result signal AGBNEF will indicate that PWF won the comparison in comparator 111.

Figure 29:
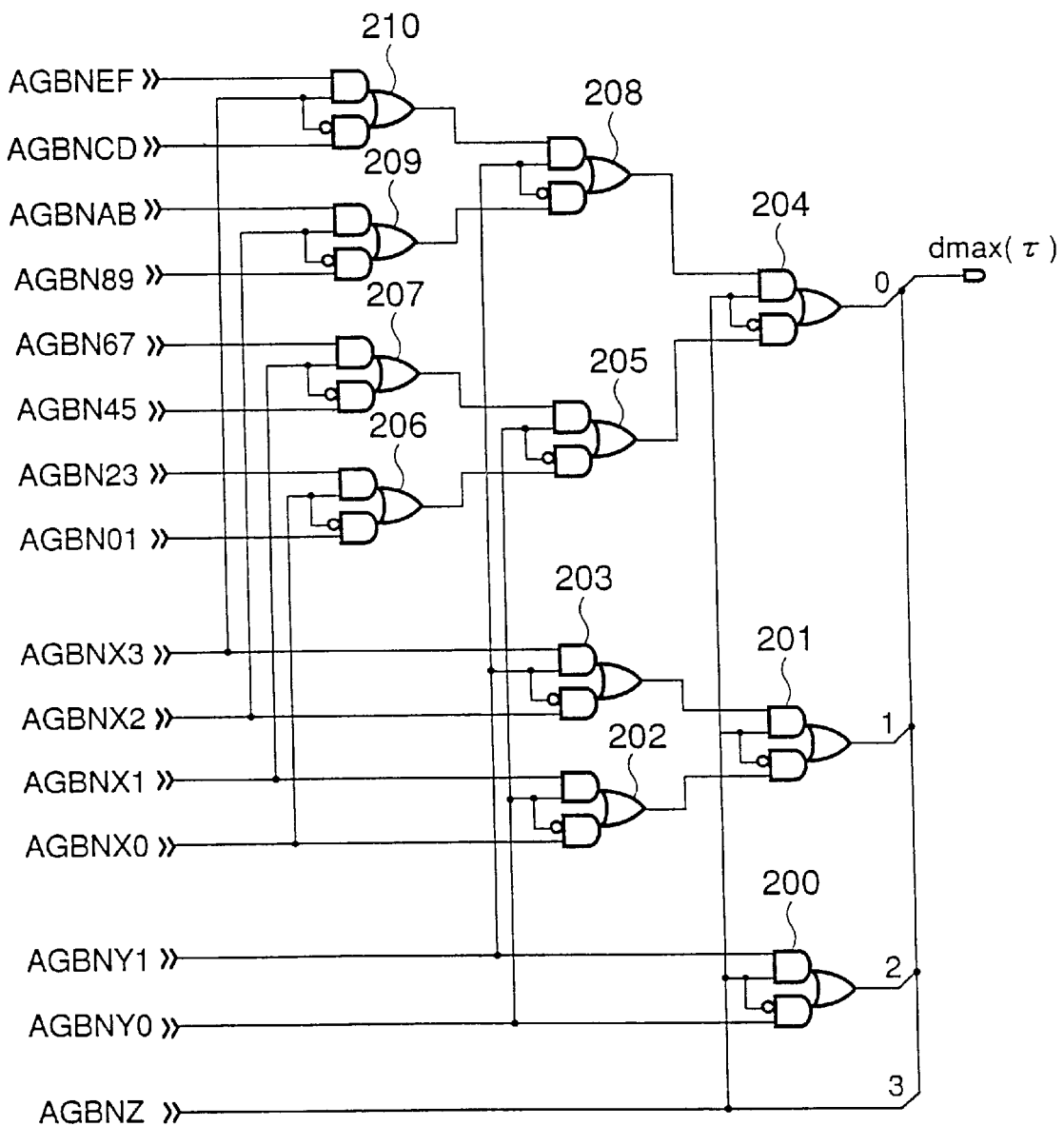
FIG. 29 is a block diagram of a second part of the invented maximum-value selector.

FIG. 29 shows the result output section, which comprises eleven one-bit selector circuits that process the result signals output by the comparators in FIG. 27. Each selector circuit comprises an OR gate and a pair of AND gates, interconnected as shown.

The result output section selects one result signal from each round. AGBNZ is the only result signal from the fourth round, so it is selected automatically. The other result signals are selected on the basis of the result signals in succeeding rounds. Selector circuit 200 selects the third-round result signal AGBNY1 when the fourth-round result signal AGBNZ is "one", and selects AGBNY0 when AGBNZ is "zero". Selector circuits 201, 202, and 203 select one of the second-round result signals AGBNX3, AGBNX2, AGBNX1, and AGBNX0 according to the values of the third- and fourth-round result signals AGBNZ, AGBNY1, and AGBNY0. Selector circuits 204 to 210 similarly select a first-round result signal on the basis of the second-, third-, and fourth-round result signals.

AGBNZ and the outputs of selectors 200, 201, and 204 are combined into a four-bit value dmax(τ), indicating which of PW0 to PWF was the largest. AGBNZ becomes the most significant bit (bit 3). The output of selector 200 becomes the second bit (bit 2). The output of selector 201 becomes the third bit (bit 1). The output of selector 204 becomes the least significant bit (bit 0).

FIG. 30 illustrates the operation of the result output circuit. If PW0, for example, is the largest input value, then dMAX(τ) has the value '0000' obtained by combining AGBN01, AGBNX0, AGBNY0, and AGBNZ. These are the result signals output by the four comparators 118, 124, 132, and 141 in FIG. 27 that compared PW0 with other values. Similarly, if PW9 is the largest input value, then dMAX(τ) has the value '1001' obtained by combining the result signals AGBN89, AGBNX2, AGBNY1, and AGBNZ output by the comparators 114, 122, 131, and 141 in FIG. 27, which compared PW9 with other values. In the language of single-elimination tournaments, the output result is obtained by tracing the course of the winning input backward through the tournament and assembling bits that indicate whether the opponents defeated by the winning input came from higher-numbered or lower-numbered input sources.

The comparisons and selections in FIGS. 27 and 29 are all made in a single clock period of the recovered sample clock. Once the enhanced histogram counts PW0 to PWF are available, operation of the maximum-count selector 75 ripples from left to right in FIG. 27, and from left to right in FIG. 29, without the need for additional clock signals. The final result dmax(τ) is obtained with substantially no delay, regardless of the number of input values. This is due both to the concurrent comparisons made in FIG. 27, and to the way in which the result is assembled by the result output circuit in FIG. 29, without the need to store source numbers in registers or rewrite register contents.

The circuit shown in FIGS. 27 to 30 can be used as a general-purpose maximum-value selector in a variety of applications requiring rapid identification of a maximum value from among a plurality of input values. The output of the maximum-value selector can be the maximum value itself, obtained as the C output of comparator 141 in FIG. 27, or the information identifying the source of the maximum value, output by the circuit in FIG. 29, or both this information and the maximum value.

Figure 31:
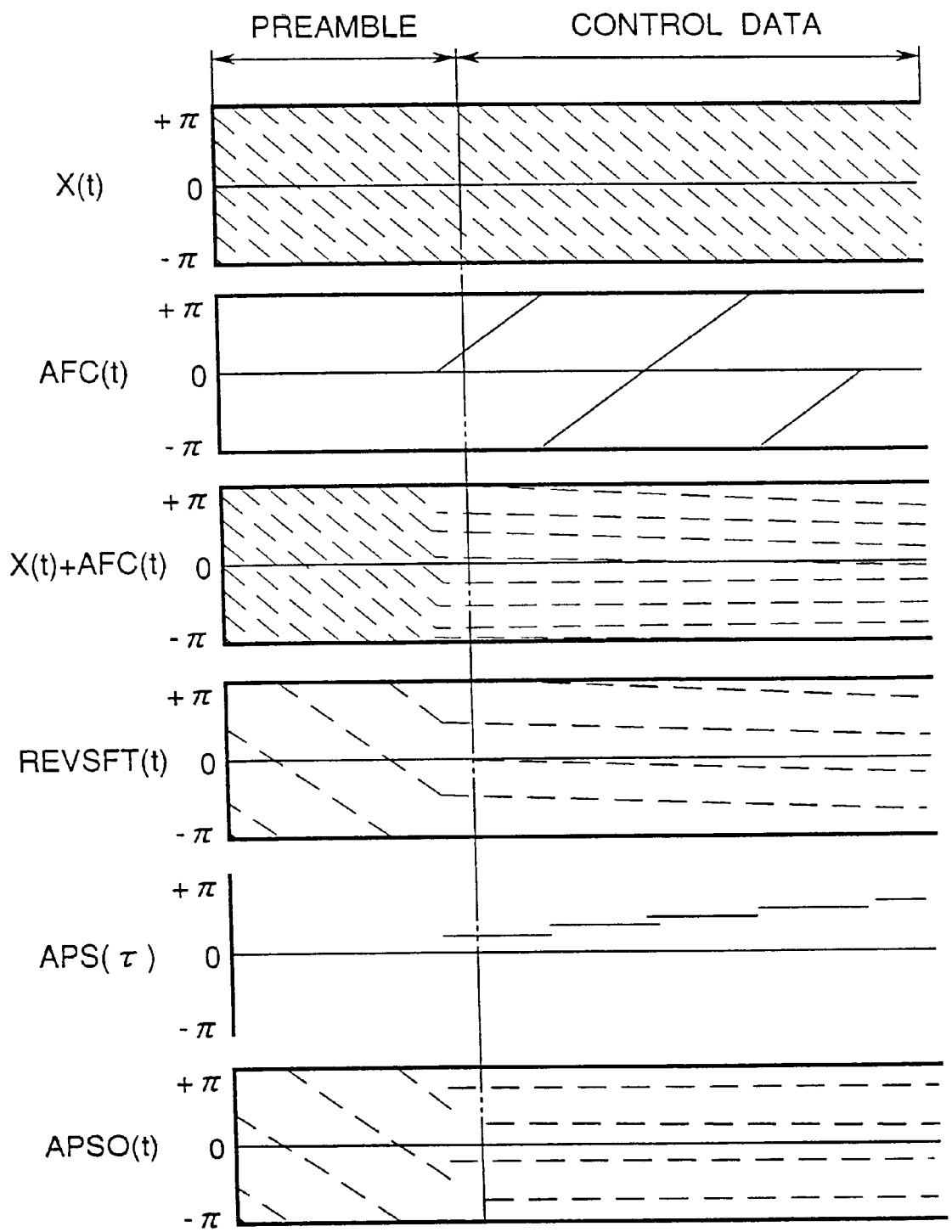
FIG. 31 is a timing diagram illustrating the overall operation of the invented digital demodulator in a communication burst having a preamble.
Figure 32:
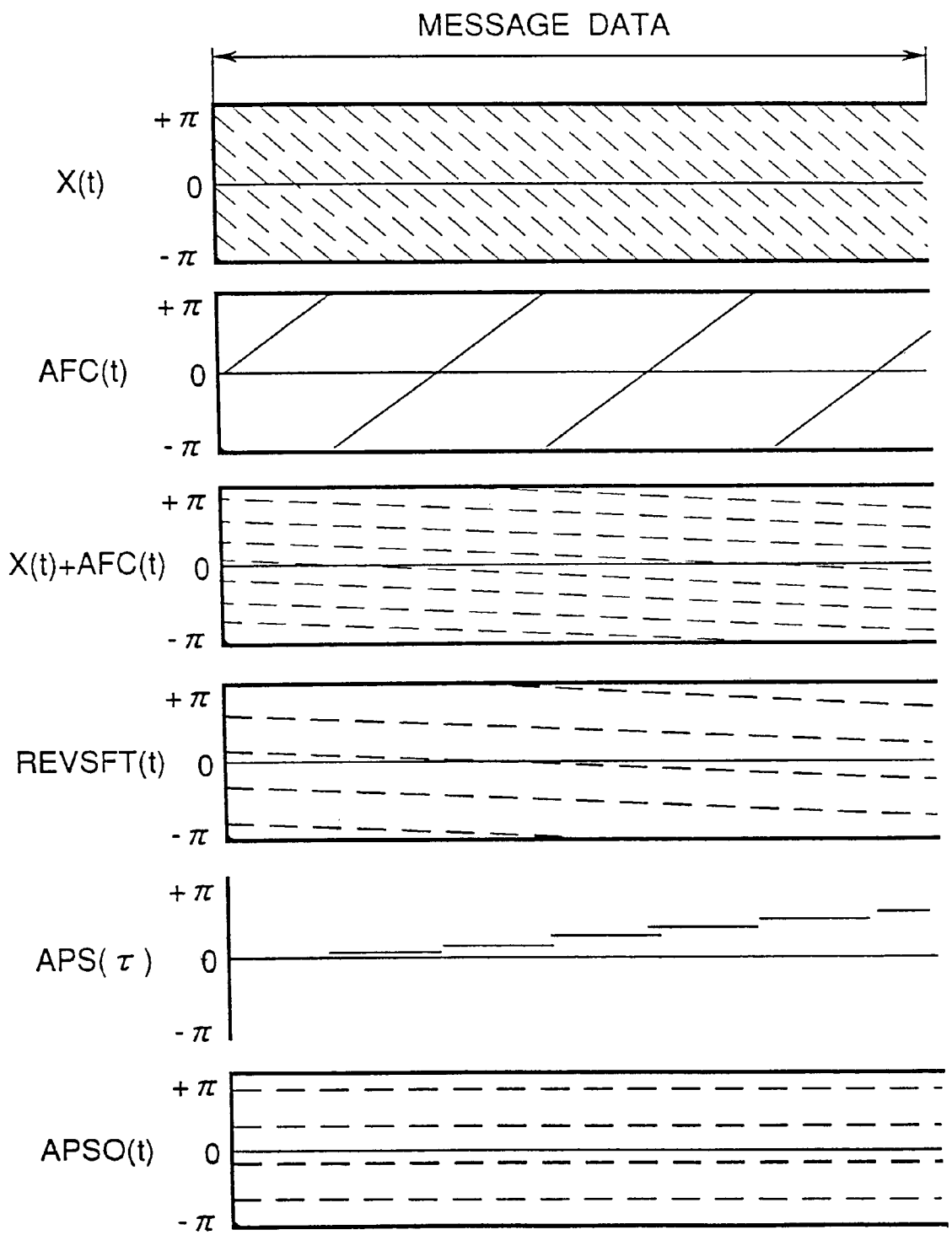
FIG. 32 is a timing diagram illustrating the overall operation of the invented digital demodulator in a communication burst without a preamble.

The overall operation of both the first and second embodiments of the invented digital demodulator is illustrated in FIGS. 31 and 32. FIG. 31 illustrates operations in a control channel, where a preamble is followed by control information. FIG. 32 illustrates subsequent operations in a traffic channel, where only message information is present. Time is indicated on the horizontal axis, and signal values on the vertical axis.

During the preamble, at successive symbol intervals, the instantaneous phase signal X(t) output from the phase comparator 10 circulates among eight phase values as illustrated in FIG. 12. Due to fading effects, frequency and phase offset between the modulated and unmodulated carrier signals, and random noise in the transmission channel, this constellation of eight values is unstable. FIG. 31 indicates the effect of a strong carrier frequency offset, causing the eight values of X(t) to drift steadily and rapidly downward.

After differential detection by the delay calculator 19, the instantaneous phase signal is furnished to the clock recovery circuit 20, which outputs the recovered clock signal RC. After RC has stabilized, the frequency-offset detector 13 begins output of the frequency-offset compensation signal AFC(t). In the previous descriptions output of AFC(t) began after the end of the preamble, but in FIG. 31, output of AFC(t) begins slightly before the end of the preamble. The exact timing depends on when clock synchronization is achieved. The value of AFC(t) is fairly accurate because it starts from a value FDFav obtained from preamble data read from the phase memory unit 12 after the recovered clock has stabilized.

By adding X(t) and AFC(t), the adder 14 removes most of the effect of the frequency offset, but a small residual frequency offset remains. Even after the end of the preamble, the eight values of X(t)+AFC(t) in FIG. 31 continue to drift down, although at a much reduced rate.

By rotating X(t)+AFC(t) through −π/4 per symbol, the −π/4 phase rotator 15 reduces the number of values in the phase constellation from eight to four. During the preamble, only two of these values occur, as illustrated in FIG. 13. The output of the −π/4 phase rotator 15 is the REVSFT(t) signal in FIG. 31. REVSFT(t) also continues to drift downward due to residual frequency offset.

From REVSFT(t), the phase-offset detector 16 produces a phase-offset compensation signal APS(τ) that is updated at intervals of eight symbols and added to REVSFT(t) to produce APSO(t). In FIG. 31, the gradual increase in APS(τ)

cancels the downward drift of REVSFT(t), so that their sum APSO(t) is stabilized at the four nominal values of $\pi/4$, $3\pi/4$, $-3\pi/4$, and $-\pi/4$, as shown at the bottom of FIG. 31.

After the completion of initial communication in the control channel, the receiver shifts to a traffic channel and begins receiving message data. Operation of the digital demodulator continues in the same way, as illustrated in FIG. 32. Addition of AFC(t) cancels most of the drift in the eight values of X(t), which are reduced to four values in REVSFT(t). Addition of APS($\tau$) cancels substantially all of the remaining drift.

The AFC(t) signal shown in FIG. 32 changes at a constant rate of FDFav per symbol, but in the second embodiment, this rate can be adjusted on the basis of changes in the phase offset so as to reduce the residual frequency offset, and to track changes in frequency offset.

As FIGS. 31 and 32 show, the accuracy of the phase-offset compensation signal APS($\tau$) has the final determining effect on the accuracy of the values provided to the data decision circuit 18. The enhanced histogram processing employed in the present invention is capable of generating an accurate phase-offset compensation signal which is not readily disturbed by phase noise. The adaptation in the second embodiment enables the phase-offset detector 16 to function successfully even when the phase offset crosses quadrant boundaries in the phase plane.

The coherent detection scheme, by which the data decision circuit 18 detects four fixed values ($\pi/4$, $3\pi/4$, $-3\pi/4$, and $-\pi/4$), already has the capability to improve receiving sensitivity by several decibels. The improved methods of detecting frequency offset and phase offset described above provide a further improvement, with a corresponding increase in the distance over which communication is possible.

By storing preamble samples in the phase memory unit 12, the invented digital demodulator enables the preamble to be used not only for clock synchronization (its original purpose) but for accurate detection of frequency offset, thereby making maximum utilization of the known preamble data pattern. The result is a greatly increased phase-noise margin, enabling communication to be established quickly and reliably, even in noisy environments.

The invented digital demodulator is well suited for large-scale integration. The invented maximum-count selector 75 in particular provides an efficient means of obtaining maximum values, without the need to generate an extra clock signal.

Next, an embodiment of the invented diversity receiver will be described.

Figure 33:
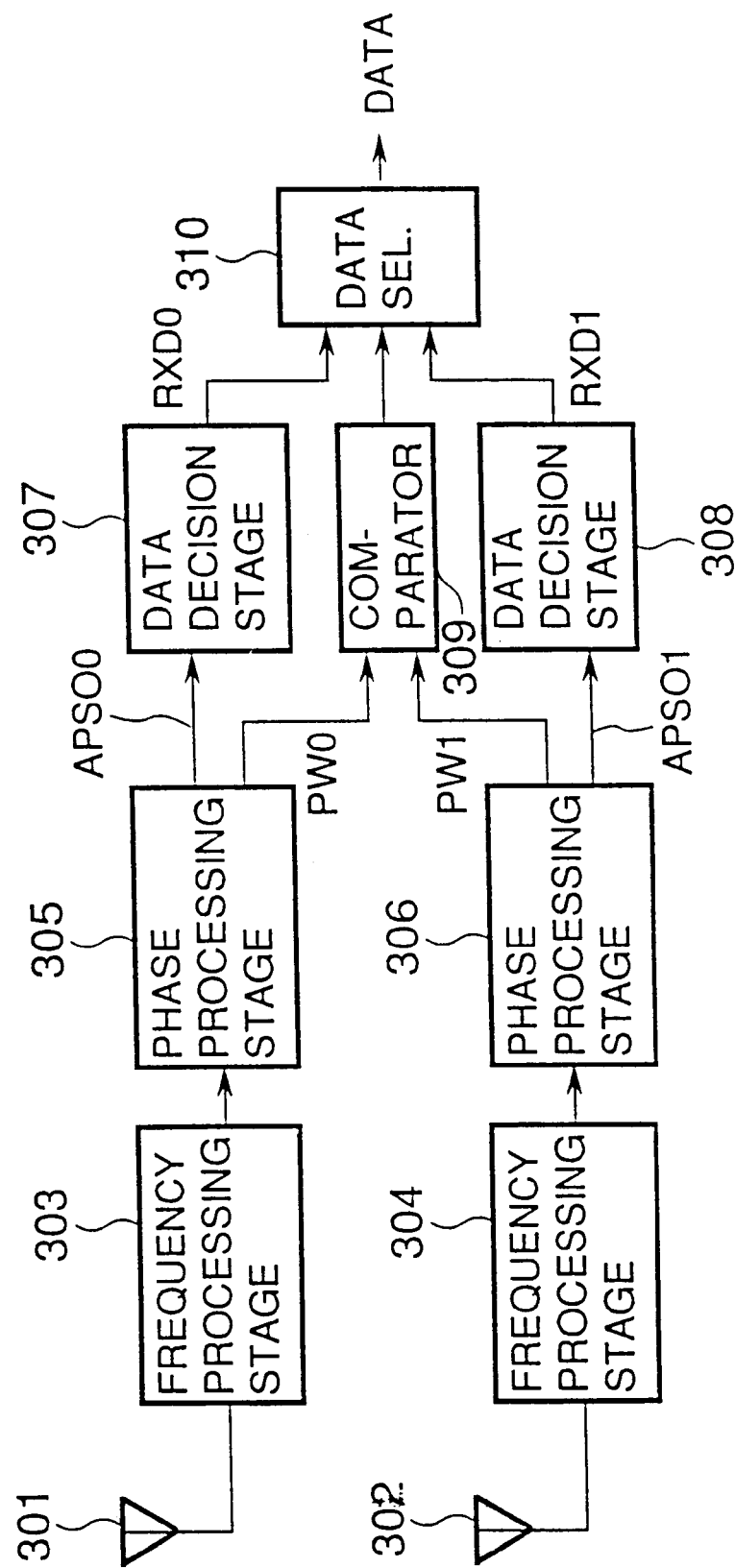
FIG. 33 is a block diagram of an embodiment of the invented diversity receiver.

Referring to FIG. 33, this embodiment is a double-diversity receiver, having two antennas 301 and 302 separated by a certain distance, two frequency processing stages 303 and 304, two phase processing stages 305 and 306, and two data decision stages 307 and 308, forming two independent receiving systems.

The frequency processing stages 303 and 304 amplify and down-convert the signals received at the antennas 301 and 302, and compensate for carrier-frequency offset. Each frequency processing stage separately comprises the phase comparator 10, carrier generator 11, phase memory unit 12, frequency-offset detector 13, and adder 14 of the invented digital demodulator, or equivalent circuits, as well as amplifiers and other well-known receiving circuits.

Each of the phase processing stages 305 and 306 comprises the $-\pi/4$ phase rotator 15, phase-offset detector 16, and adder 17 of the invented digital demodulator. The maximum enhanced histogram count PW[dmax($\tau$)] found by the maximum-count selector 75 in the phase-offset detector 16 in each phase processing stage 305 and 306 is output to a comparator 309. The two maximum enhanced histogram counts are denoted $PW_0$ and $PW_1$, respectively.

The phase processing stages 305 and 306 also output instantaneous phase signals, rotated to compensate for frequency and phase offset as described in the first or second embodiment, to the respective data decision stages 307 and 308. These instantaneous phase signals are denoted APSO0 and APSO1. The data decision stages 307 and 308 are equivalent to the data decision circuit 18 in FIG. 1, and produce separate received data values RXD0 and RXD1.

The comparator 309 compares $PW_0$ and $PW_1$, and commands a data selector 310 to select the received data from the receiving system with the higher maximum enhanced histogram count. RXD0 is selected if $PW_0$ is larger than $PW_1$, and RXD1 if $PW_1$ is larger than $PW_0$. The selected data are output from the data selector 310.

In conventional double-diversity receivers, selection of the output data is controlled by detecting and comparing the strength of the signals received at the two antennas. Signal-strength detection is performed by means of analog detectors, which generally require adjustment after being manufactured. If no adjustment is carried out, an extra means of compensation for differences between the detectors must be provided. In any case an extra cost is incurred, and despite adjustment or compensation, there remain variations from one manufactured unit to another. This form of control is inherently expensive and imprecise.

In a diversity receiver according to the present invention, the output data are selected on the basis of enhanced histogram counts obtained from digital circuits that require no adjustment or compensation. While no exact relationship between signal strength and maximum enhanced histogram count can be formulated, on a good communication channel the phase offsets will tend to cluster closely around a single value, producing a histogram with a tall peak, while on an inferior channel the phase offsets will tend to be more scattered, producing a histogram with greater variation and a lower peak value. The maximum enhanced histogram counts $PW_0$ and $PW_1$ are thus indicative of the quality of the respective communication channels.

These channels include not only the signal paths from the transmitting antenna (not visible) to the two receiving antennas 301 and 302, but also the receiving circuits preceding the phase processing stages 305 and 306. In particular, comparison of $PW_0$ and $PW_1$ provides built-in detection of the effects of differences between amplifiers and other analog circuit elements in the frequency processing stages 303 and 304, obviating the need for precise matching of these analog circuit elements.

The values of $PW_0$ and $PW_1$ are updated frequently, e.g. at intervals of sixteen symbols, so when fading occurs on one channel, the selector 310 can switch promptly to the other channel to maintain good reception. Comparison of $PW_0$ and $PW_1$ provides a fast, inexpensive, and accurate method of controlling a diversity receiver.

The present invention is not limited to the embodiments described above. The phase comparator 10, for example, is not limited to the circuit shown in FIGS. 3 and 4. Any circuit that converts the phase difference between two input signals to a value that varies linearly over intervals of 2&P can be employed. The invention is not limited to six-bit phase resolution or to the associated numeric values such as eight and sixty-four mentioned in the embodiments. Nor is the invention limited to $\pi/4$-shift QPSK modulation. The invented circuits can readily be adapted for use with other phase-shift-keying systems, such as BPSK, non-shifted QPSK, 8-ary PSK, and offset QPSK. The first aspect of the invention is applicable to digital demodulators in general, including frequency-shift-keying (FSK) demodulators.

The $-\pi/4$ phase rotation performed by the $-\pi/4$ phase rotator 15 can be performed after phase offset compensation instead of before. If the modulation system does not employ a $\pi/4$ phase shift, the $-\pi/4$ phase rotator 15 can be omitted, and the adders 50 and 51 in the frequency-offset detector 13 can be omitted.

In the phase-offset detector 16, the histogram enhancer 74 can be omitted if the interval over which the histogram counts are taken is sufficiently long.

The maximum-value selector 75 can be modified by appending input source information (e.g. the hexadecimal digits 0 to F in FIG. 27) to the values to be compared, so that both the maximum value and its input source number are obtained from the comparator in the last round, without the need for result signals or the result output circuit in FIG. 29.

The invented digital demodulator and diversity receiver are useful in a variety of communication equipment, not limited to cellular telephone systems, and not even limited to wireless systems. The invented maximum-value selector can be applied in devices other than digital demodulators, and in system other than communication systems.

Those skilled in the art will recognize that further variations are possible within the scope claimed below.

What is claimed is:

1. A digital demodulator that receives a modulated signal modulated by phase-shift keying, said digital demodulator including
   a carrier generator generating an unmodulated signal nominally equal in frequency to said modulated signal but not synchronized in phase to said modulated signal,
   a phase comparator comparing said modulated signal and said unmodulated signal to generate an instantaneous phase signal,
   a clock recovery circuit coupled to said phase comparator, for recovering from said modulated signal a clock signal having a certain clock period, and
   a frequency-offset compensation section shifting said instantaneous phase signal in phase to compensate for a frequency offset between said modulated signal and said unmodulated signal, wherein said modulated signal has a preamble for synchronization and an information section for communication, and said frequency-offset compensation section comprises:
      a memory coupled to said phase comparator, for storing values of the instantaneous phase signal output by said phase comparator during part of said preamble, said values being obtained at intervals shorter than said clock period;
      a frequency-offset detector coupled to said memory, said frequency offset-detector receiving from said memory, after said part has ended, values that were stored in said memory in intervals equal to said clock period, detecting said frequency offset from the received values, and generating a frequency-offset compensation signal; and
      a frequency-offset corrector coupled to said frequency-offset detector, said frequency-offset corrector receiving said clock signal from said clock recovery circuit, operating at timings determined by said clock signal, and combining said instantaneous phase signal and said frequency-offset compensation signal, thereby shifting said instantaneous phase signal in phase, during said information section.

2. A digital demodulator that receives a modulated signal modulated by phase-shift keying, having a carrier generator that generates an unmodulated signal nominally equal in frequency to said modulated signal but not synchronized in phase to said modulated signal, having a phase comparator that compares said modulated signal and said unmodulated signal to generate an instantaneous phase signal, and having a phase-offset compensation section that rotates said instantaneous phase signal in phase to compensate for a phase offset between said modulated signal and said unmodulated signal, wherein said phase-offset compensation section comprises:
   a modulo calculator for calculating values of said instantaneous phase signal, modulo a certain phase angle, at regular intervals;
   a histogram calculator coupled to said modulo calculator, for counting occurrences of each of the values calculated by said modulo calculator, thereby creating a histogram of said values;
   a maximum-count selector coupled to said histogram calculator, for detecting a value having a maximum count in said histogram;
   an arithmetic circuit coupled to said maximum-count selector, for performing an arithmetic operation on said value having a maximum count, thereby generating a phase-offset compensation signal; and
   a phase-offset corrector coupled to :said arithmetic circuit, for combining said instantaneous phase signal and said frequency-offset compensation signal, thereby rotating said instantaneous phase signal in phase.

3. The digital demodulator of claim 2, wherein said arithmetic circuit takes a difference between a fixed value and said value having a maximum count.

4. The digital demodulator of claim 2, wherein said arithmetic circuit takes a difference between said value having a maximum count and a selected one of a plurality of fixed values differing by said phase angle, selecting said one of said plurality of fixed values so that successive values of said phase-offset compensation signal do not differ by more than half of said phase angle.

5. The digital demodulator of claim 2, wherein said phase-offset compensation section also comprises:
   a histogram enhancer for enhancing said histogram by replacing each count in said histogram with a weighted sum of counts of occurrences of at least three adjacent values.

6. The digital demodulator of claim 5, wherein said weighted sum is calculated using unequal weights.

7. The digital demodulator of claim 5, wherein said weighted sum is calculated using equal weights.

8. The digital demodulator of claim 2, wherein said maximum-count detector detects said value having a maximum count by making concurrent comparisons of different pairs of counts in said histogram, according to a single-elimination tournament plan.

9. The digital demodulator of claim 8, wherein said maximum-count detector comprises:
   a comparison section for making said concurrent comparisons, and generating result signals indicating results of said comparisons; and
   a result output section for selecting said value having a maximum count, responsive to said result signals.

10. The digital demodulator of claim 2, wherein said maximum-count selector comprises:
   a plurality of comparators making comparisons among different count pairs of said histogram in successive rounds according to a single-elimination tournament plan, said comparisons being made concurrently within each round among said rounds.

11. The digital demodulator of claim 10, wherein each comparator among said comparators outputs both a larger count between two compared counts and a result signal indicating which of said two compared counts was the larger count, the maximum-count selector further comprising:

a result output section for identifying said value having said maximum count, responsive to the result signal output by each comparator among said comparators.

12. The digital demodulator of claim 11, wherein each said result signal is a one-bit signal.

13. The digital demodulator of claim 12, wherein said result output section identifies said value having said maximum count by taking a result signal from one comparator in each said round.

14. A receiver, comprising:

a first receiving circuit that receives a first modulated signal, generates a first unmodulated signal, constructs a first histogram of phase offsets between said first modulated signal and said first unmodulated signal, finds a first maximum value in said first histogram, thereby identifies a first phase offset between said first modulated signal and said first unmodulated signal, and demodulates said first modulated signal to obtain first received data, with compensation for said first phase offset;

a second receiving circuit that receives a second modulated signal, generates a second unmodulated signal, constructs a second histogram of phase offsets between said second modulated signal and said second unmodulated signal, finds a second maximum value in said second histogram, thereby identifies a second phase offset between said second modulated signal and said second unmodulated signal, and demodulates said second modulated signal to obtain second received data, with compensation for said second phase offset;

a comparator coupled to said first receiving circuit and said second receiving circuit, for comparing said first maximum value and said second maximum value to determine which is larger; and a data selector coupled to said comparator, for selecting said first received data when said first maximum value is larger than said second maximum value, selecting said second received data when said second maximum value is larger than said first maximum value, and providing output of the received data thus selected.

15. The receiver of claim 14, wherein said first receiving circuit and said second receiving circuit enhance said first histogram and said second histogram by taking weighted sums of values in respective histograms.

16. The receiver of claim 14, wherein said first receiving circuit and said second receiving circuit find said first maximum value and said second maximum value by making concurrent comparisons of values in respective histograms according to a single-elimination tournament plan.

17. A method of compensating for a frequency offset between an unmodulated signal and an input signal modulated by a phase-shift keying so as to transmit a preamble followed by an information section to obtain an instantaneous phase signal, said method comprising the steps of:

recovering a clock signal from said input signal during said preamble;

storing sample values of said instantaneous phase signal in a memory during said preamble;

reading at least some of said sample values from said memory after said clock signal becomes stable;

detecting said frequency offset from the sample values read from said memory;

generating a frequency-offset compensation signal that changes at a rate responsive to the detected frequency offset; and adding said frequency-offset compensation signal to said instantaneous phase signal during said information section.

18. The method of claim 17, wherein said clock signal has a certain clock period, said sample values are stored in said memory at intervals shorter than said clock period, and the sample values read from said memory are sample values that were stored in said memory at intervals equal to said clock period.

19. A method of compensating for a phase offset between an input signal, modulated by phase-shift keying, and an unmodulated signal with which said first signal is compared to obtain an instantaneous phase signal, comprising the steps of:

calculating values of said instantaneous phase signal modulo a certain phase angle;

counting occurrences of said values over a certain interval of time, thereby obtaining a histogram;

selecting a value with a maximum count in said histogram;

generating a phase-offset compensation signal equal to a difference between said value with a maximum count and a nominal value;

repeating the above steps at successive intervals of time, thereby generating successive phase-offset compensation signals; and combining said phase-offset compensation signals with said instantaneous phase signal.

20. The method of claim 10, wherein said nominal value is fixed.

21. The method of claim 19, comprising the further step of:

selecting said nominal value from a set of nominal values differing by integer multiples of said phase angle, said nominal value being selected so that successive phase-offset compensation signals do not differ from one another by more than one-half of said phase angle.

22. The method of claim 19, wherein said input signal is modulated by quaternary phase-shift keying, and said phase angle is $\pi/2$ radians.

23. The method of claim 19, comprising the further step of:

enhancing said histogram by replacing each count in said histogram with a weighted sum of counts of occurrences of at least three adjacent values.

24. The method of claim 23, wherein said weighted sum is calculated using unequal weights.

25. The method of claim 23, wherein said weighted sum is calculated using equal weights.

26. The method of claim 19, wherein said step of selecting a value with a maximum count further comprises the step of:

comparing count pairs of said histogram according to a single-elimination tournament plan having a plurality of rounds; wherein the count pairs compared in each round among said rounds being compared concurrently.

27. The method of claim 26, wherein said step of selecting a value with a maximum count comprises the further steps of:

generating a result signal from each comparisons made in each said round, indicating which compared count is larger; and selecting one said result signal from each round, responsive to result signals in succeeding round, thereby identifying one value having said maximum count.

28. The method of claim 27, wherein each said result signal is a one-bit signal.

29. A method of selecting output data in a diversity receiver having a plurality of digital demodulators that receive respective modulated signals modulated by phase-shift keying, demodulate said modulated signals by comparison with respective unmodulated signals, and thereby produce respective received data, comprising the steps of:

counting occurrences of different phase offsets between said modulated signals and respective unmodulated signals, modulo a certain phase angle;

obtaining, for each of said modulated signals, a histogram of occurrence counts of said phase offsets;

selecting a maximum occurrence count from each said histogram;

comparing maximum occurrence counts thus selected, thereby determining a largest maximum occurrence count; and selecting, as said output data, the received data produced by demodulating a modulated signal from which said largest maximum occurrence count was also obtained.

30. The method of claim 29, comprising the further step of:

enhancing each said histogram by replacing each occurrence count in said histogram with a weighted sum of occurrences counts of at least three adjacent phase offsets.

31. The method of claim 30, wherein said weighted sum is calculated by using unequal weights.

32. The method of claim 30, wherein said weighted sum is calculated by using equal weights.

* * * * *